US012730476B2

(12) United States Patent
Lee et al.

(10) Patent No.: US 12,730,476 B2
(45) Date of Patent: Sep. 8, 2026

(54) SMART RING DEVICE INCLUDING SENSOR

(71) Applicant: Samsung Electronics Co., Ltd., Suwon-si (KR)

(72) Inventors: Jeehoon Lee, Suwon-si (KR); Eungi Min, Suwon-si (KR); Seonho Han, Suwon-si (KR); Younghyun Kim, Suwon-si (KR); Jeongmin Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 19/050,542

(22) Filed: Feb. 11, 2025

(65) Prior Publication Data

US 2025/0390140 A1 Dec. 25, 2025

Related U.S. Application Data

(63) Continuation of application No. PCT/KR2025/001851, filed on Feb. 7, 2025.

(30) Foreign Application Priority Data

Jun. 25, 2024 (KR) ........................ 10-2024-0083125
Jul. 9, 2024 (KR) ........................ 10-2024-0090384

(51) Int. Cl.
*G06F 1/16* (2006.01)

(52) U.S. Cl.
CPC ............ *G06F 1/163* (2013.01); *G06F 1/1698* (2013.01)

(58) Field of Classification Search
CPC ............................... G06F 1/163; G06F 1/1698
See application file for complete search history.

(56) References Cited

U.S. PATENT DOCUMENTS 9,861,314 B2 1/2018 Haverinen et al.
10,893,833 B2 1/2021 Haverinen et al.
(Continued)

FOREIGN PATENT DOCUMENTS

CN 112578486 B * 11/2023 ............ H10F 30/21
CN 221044418 U 5/2024
(Continued)

OTHER PUBLICATIONS

International Search Report dated May 16, 2025 for PCT/KR2025/001851.

*Primary Examiner* — Matthew A Eason
*Assistant Examiner* — Chayce R Bibbee
(74) *Attorney, Agent, or Firm* — Nixon & Vanderhye P.C.

(57) ABSTRACT

Disclosed is a smart ring device including: a sensor, an outer ring, an inner ring disposed inside the outer ring, a printed circuit board disposed between the outer ring and the inner ring, and a first protrusion protruding from one surface of an inner part of the inner ring in a central direction of the smart ring device, the printed circuit board may include a first light receiving element disposed in a first position of the outer ring, and a first light emitting element disposed at a second position of the outer ring, and configured to transmit a first signal of a first frequency band, wherein the first protrusion may include a first part protruding from the first light emitting element in a first direction facing the center of the smart ring device, and a second part connected to the first part, and protruding from the first light receiving element in a second direction facing the center of the smart ring device.

19 Claims, 13 Drawing Sheets

(56) References Cited

U.S. PATENT DOCUMENTS

| | | | | |
|---|---|---|---|---|
| 11,324,292 | B2 | 5/2022 | Min et al. | |
| 11,850,069 | B1 | 12/2023 | Mars et al. | |
| 11,853,030 | B2 | 12/2023 | Sanchez | |
| 11,963,590 | B2 | 4/2024 | Min et al. | |
| 12,074,637 | B2 | 8/2024 | Vallius et al. | |
| 12,213,790 | B2 | 2/2025 | Lee et al. | |
| 12,557,886 | B2 | 2/2026 | Min et al. | |
| 2014/0275852 | A1* | 9/2014 | Hong | A61B 5/0002 600/479 |
| 2018/0103902 | A1 | 4/2018 | Haverinen | |
| 2022/0192568 | A1 | 6/2022 | Lee et al. | |
| 2023/0113714 | A1* | 4/2023 | Vallius | G16H 40/67 398/25 |
| 2023/0205170 | A1 | 6/2023 | Sanchez | |
| 2023/0380692 | A1* | 11/2023 | Huttunen | G06F 1/163 |
| 2024/0090835 | A1 | 3/2024 | Watanabe | |
| 2024/0126236 | A1 | 4/2024 | Sanchez | |
| 2024/0164716 | A1 | 5/2024 | Mars et al. | |
| 2026/0069003 | A1 | 3/2026 | Min | |

FOREIGN PATENT DOCUMENTS

| | | | |
|---|---|---|---|
| JP | 2024-039543 | A | 3/2024 |
| KR | 1020170091346 | A | 8/2017 |
| KR | 10-2024-0068367 | A | 5/2024 |

* cited by examiner

SMART RING DEVICE INCLUDING SENSOR

CROSS-REFERENCE TO RELATED APPLICATIONS

This application is a continuation of International Application No. PCT/KR2025/001851 designating the United States, filed on Feb. 7, 2025, in the Korean Intellectual Property Receiving Office and claiming priority to Korean Patent Application No. 10-2024-0083125, filed on Jun. 25, 2024 and Korean Patent Application No. 10-2024-0090384, filed on Jul. 9, 2024, in the Korean Intellectual Property Office, the disclosures of each of which are incorporated by reference herein their entireties.

BACKGROUND

1. Field

The disclosure relates to a smart ring device having a structure that may more precisely collect sensor signals related to a living body using a sensor.

2. Description of Related Art

A wearable electronic device is an electronic device designed to be mounted on a specific part of a user's body, and because these wearable electronic devices are directly mounted on the body, they are relatively miniaturized compared to other electronic devices, and the shape may vary according to the mounting position. The wearable electronic device may collect a sensor signal related to a living body according to performing a sensing function while being mounted on the user's body. In this regard, in the wearable electronic device, a sensor may be disposed at a portion that faces the user's body. The sensor may irradiate a specific signal and collect a signal reflected after passing through the user's body. The wearable electronic device may be configured to perform specific processing on a signal collected by the sensor.

The above-described information may be provided as a background art for the purpose of helping understanding of the disclosure. No assertion is made as to whether any of the above may be applied as a prior art in connection with the disclosure.

SUMMARY

A smart ring device including a sensor according to an example embodiment of the disclosure may include: an outer ring (or outer ring portion, outer portion of the ring, an outer structure), an inner structure ring (or inner ring portion, inner ring, inner portion of the ring, inner structure) disposed inside the outer ring, a printed circuit board disposed between the outer ring and the inner ring, and a first protrusion (or protrusion, protruding part) protruding from one surface of an inner part of the inner ring in a central direction of the smart ring device, the printed circuit board may include a first light receiving element including light receiving circuitry disposed in a first position of the outer ring, and a first light emitting element including light emitting circuitry disposed at a second position of the outer ring, and configured to transmit a first signal of a first frequency band, and the first protrusion may include a first part protruding from the first light emitting element in a first direction facing the center of the smart ring device, and a second part connected to the first part, and protruding from the first light receiving element in a second direction facing the center of the smart ring device.

A smart ring device according to an example embodiment of the disclosure may include: an outer ring and an inner ring, a printed circuit board, at least a portion of which is disposed between the outer ring and the inner ring, and a first protrusion protruding from one surface of an inside of the inner ring toward a center of the smart ring, wherein the first protrusion may have a first part and a second part disposed to cover a first light receiving element comprising light receiving circuitry and a first light emitting element comprising light emitting circuitry disposed on the printed circuit board.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
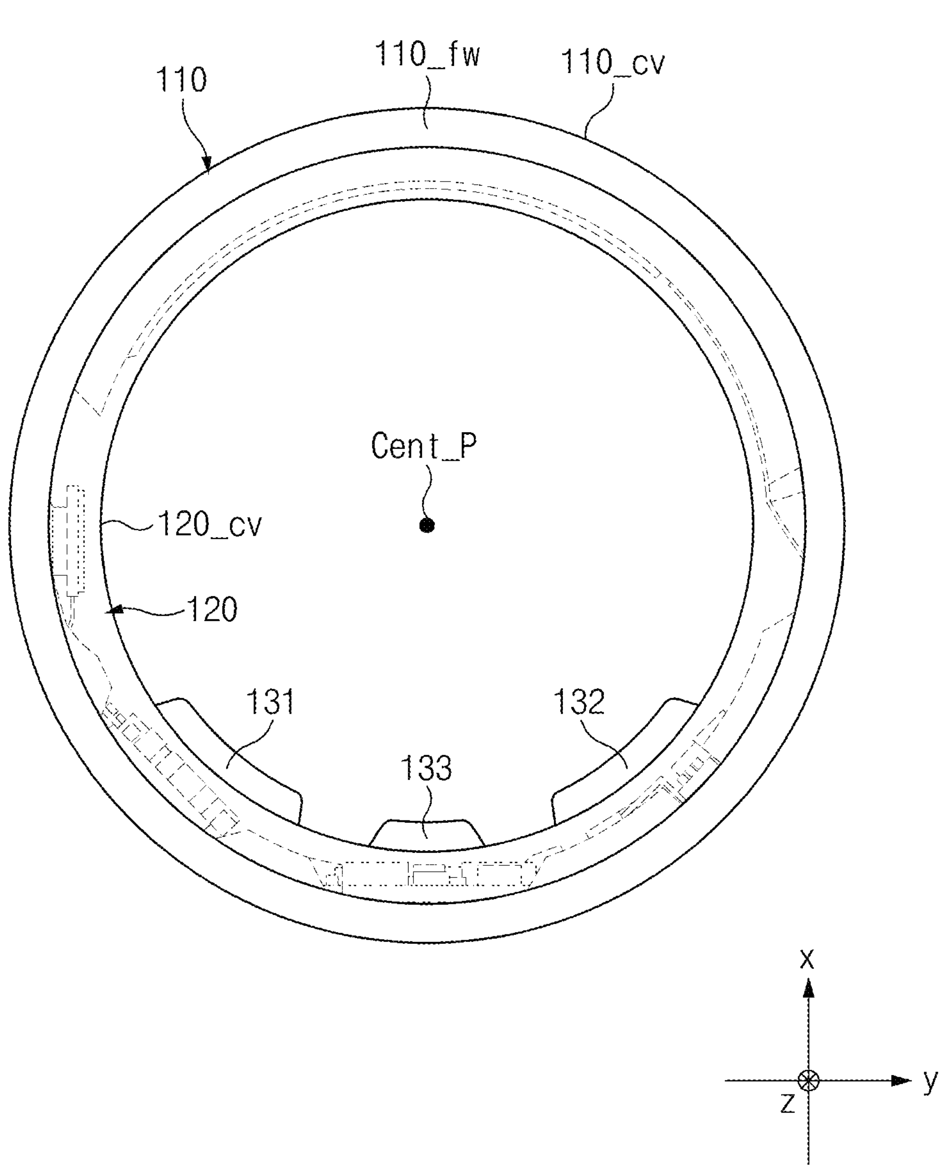
FIG. 1 is a diagram illustrating an example of an exterior of a smart ring device according to various embodiments.

Hereinafter, various example embodiments of the disclosure will be described in greater detail with reference to accompanying drawings.

The disclosure relates to a smart ring device having a structure that may be mounted on a body part (e.g., may be at least one of a finger, a toe, a wrist, and an ankle, hereinafter a finger will be illustrated), such as a user's finger, which protrudes from a body. In the smart ring device, a sensor part including at least one sensor may be disposed. The smart ring device of the disclosure may provide a structure that may reduce inflow of noise and more precisely collect a user's biometric sensor signal in relation to an operation of the at least one sensor. As an example, user's fingers, on which the smart ring device is mounted, may have different characteristics (e.g., shapes, thicknesses, and skin elasticity) from person to person. Furthermore, the characteristics of the user's finger may change according to physical activities. In consideration of this situation, the smart ring device of the disclosure may provide a stable contact state with the user's finger using at least one protruding structure (e.g., protrusion) disposed on an inner structure (e.g., an inner part of the inner structure, an inner curved surface, or an inner bottom surface).

According to an example embodiment of the disclosure, the smart ring device of the disclosure may be configured to collect a plurality of signals related to biometrics of user. As an example, the smart ring device of the disclosure may include a light emitting element (or a first type emitter, a first type signal radiation module, a first type signal irradiation module, a first type signal radiation part, a first type signal irradiation device, or a green color wavelength band light emitting element) related to collection of a signal of a first frequency band, among a plurality of sensor signals, a light emitting element (or a emitter, a signal radiation module, a signal irradiation module, a signal radiation part, a signal irradiation device, a signal irradiation device, or a red color or infrared wavelength band light emitting element) related to collection of a signal of a second frequency band, among a plurality of sensor signals, and a light receiving element (or a receiver, a signal collection module, and a signal collection device). In relation to a selective operation of the smart ring device, the light receiving element may be configured to collect reflected light after irradiation by the light emitting element or reflected light after irradiation by the light emitting element.

According to an example embodiment, the smart ring device of the disclosure includes a protruding structure disposed to cover both the first type light emitting device and the light receiving element, and when the user's finger is inserted into the smart ring device, the protruding structure is closely contacting to the user's finger skin, and at least some of the signals irradiated from the first type light emitting device may be irradiated to the finger skin (or an interior or the finger) without going through an air gap, and the light receiving element may collect signals reflected from the finger skin (or to the body tissues in the interior of the finger) without going through an air gap. In this way, in response to the use of signals in a first frequency band of the smart ring device of the disclosure, which is shorter than that of the second frequency band, it is possible to remove or reduce the air gap on the signal transmission/reception path with the skin of the finger by providing a protruding structure that surrounds the first type light emitting element that is disposed adjacent to the light receiving element together with the light receiving element, compared to the light receiving element.

Furthermore, various aspects, features and advantages provided by the smart ring device including the sensor related protruding structure according to various embodiments may be realized according to various example embodiments of the disclosure.

FIG. 1 is a diagram illustrating an example of an exterior of a smart ring device according to various embodiments.

Figure 2:
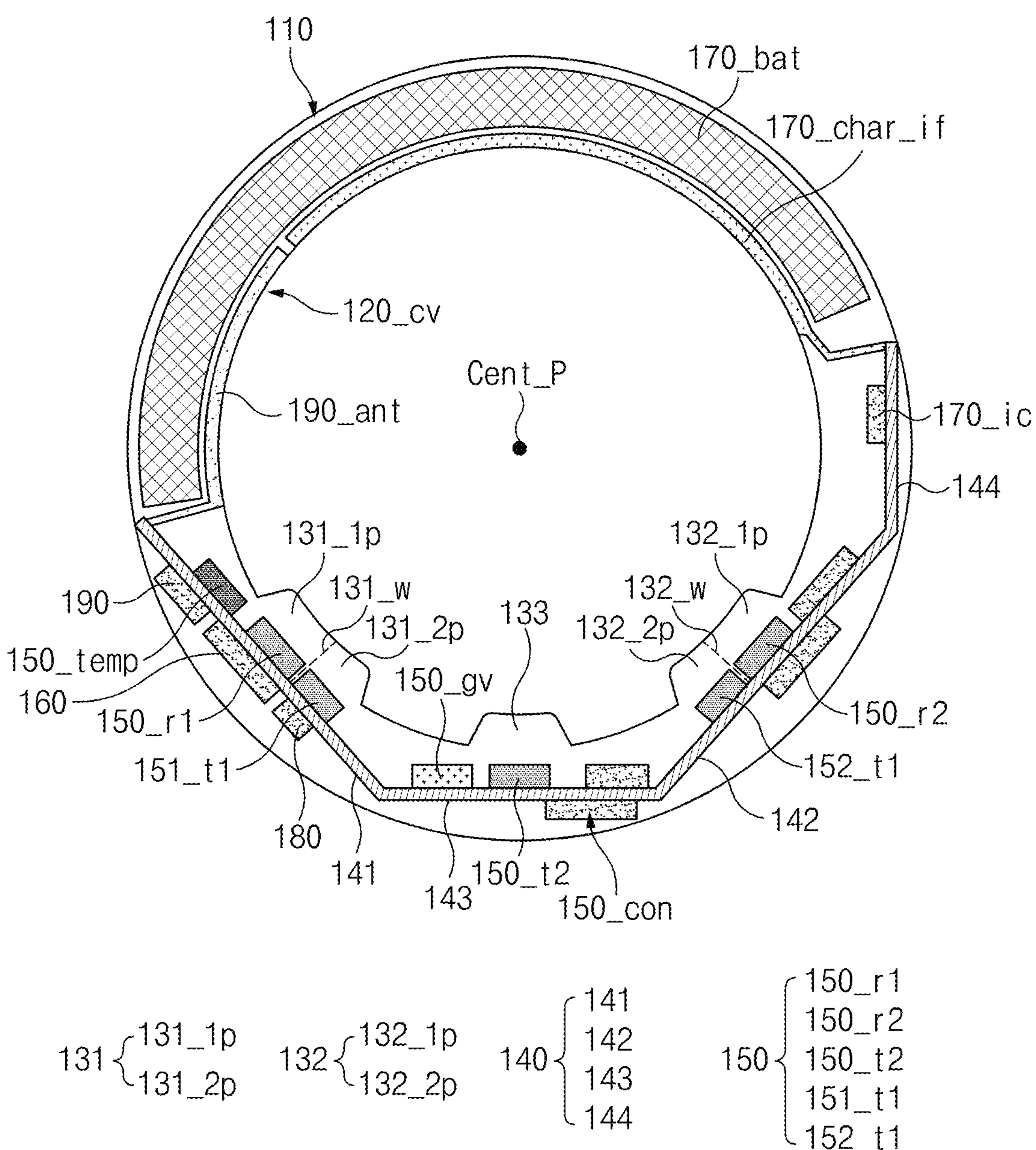
FIG. 2 is a diagram illustrating an example of an internal structure of a smart ring device according to various embodiments.

FIG. 2 is a diagram illustrating an example of an internal structure of a smart ring device according to various embodiments.

As an example, FIG. 1 illustrates an example of a front surface of a smart ring device 100 when observed in a direction, in which a user's finger is inserted (e.g., hereinafter, the z-axis direction). A rear surface (e.g., a surface observed in a direction (e.g., the −z-axis direction), in which a user's finger is withdrawn) of the smart ring device 100 may have the same shape, size, and structure as those of a front surface of the smart ring device 100. However, the disclosure is not limited thereto, and the front surface of the smart ring device 100 and the rear surface of the smart ring device 100 may be configured to have different structures.

FIG. 2 illustrates an example of a cross section obtained by cutting a portion between the front surface and rear surface of the smart ring device 100. For example, when a portion between the front surface and the rear surface of the smart ring device 100 illustrated in FIG. 1 is cut in the xy plane, an internal structure of the smart ring device 100 illustrated in FIG. 2 may be observed. The internal structure of the smart ring device 100 may be changed according to a change in a point, at which the front surface and the rear surface of the smart ring device 100 are cut by the xy plane.

Referring to FIGS. 1 and 2, according to an embodiment, the smart ring device 100 may include a ring-shaped structure having an empty center. As an example, the smart ring device 100 may include an outer structure 110 including a through part of a first size at a center portion thereof, and an inner structure 120 (or a filling structure, an injection-molded material, or an injection-molded structure) that is disposed in a first inner part (or an inner part, an inner surface, an inner peripheral surface, or an inner space) of the outer structure 110 and includes a through part of a second size that is smaller than the first size. The smart ring device 100 may include at least one internal element that is disposed between the outer structure 110 and the inner structure 120.

A first outer part 110_*cv* (or an outer part, an outer peripheral part, an outer curved part, an outer curved surface part, an outer peripheral surface, or an outer part) of the outer structure 110 may have a specific thickness (e.g., shorter than the length of the user's finger) that extends in the z-axis direction, and may have a specific length (e.g., longer than the thickness of the user's finger) in a circumferential direction with respect to a center Cent_P. The first outer part 110_*cv* of the outer structure 110 may include, for example, a surface that is observed from an outward direction toward the center Cent_P or a surface that is exposed in an outward direction, with respect to the center Cent_P of the smart ring device 100, with reference to the illustrated drawing. Although it is illustrated that the outer structure 110 has a circular periphery, the disclosure is not limited thereto, and the outer structure 110 may have various shapes. As an example, at least one mark that may guide a finger mounting portion of the smart ring device 100 may be disposed on a surface of the outer structure 110. The mark may be engraved on the surface of the outer structure 110 or embossed from the surface. The outer structure 110 may be formed of various materials. As an example, at least a portion of the outer structure 110 may be formed of a metallic material or a nonmetallic material. As an example, as at least a portion of the inner structure 120 is formed through an injection-molding process, at least a portion of the outer structure 110 may be formed of a material, by which it may maintain a designed shape without being deformed in an injection-molding environment.

A first inner part of the outer structure 110 may include a surface of the first outer part 110_*cv* of the outer structure 110 in an opposite direction. The first inner part of the outer structure 110 may have the same center Cent_P as that of the first outer part 110_*cv* of the outer structure 110, and at least a portion of the first inner part of the outer structure 110 may include a surface that is observed outward from the center Cent_P. As an example, the first inner part of the outer structure 110 may include an area, in which at least one internal element may be seated. An area, in which the internal element may be seated, may be formed along at least a portion of the circumference at at least a portion of the first inner part of the outer structure 110. At least a portion of the first inner part (or an inner curved surface, an inner peripheral surface, an inner part, an inner curved surface, or an inner bottom surface) of the outer structure 110 may face the second outer part of the inner structure 120. At least a portion of the first inner part of the outer structure 110 may contact at least a portion of the second outer part of the inner structure 120.

A side portion of the outer structure 110 may include an outer front side wall 110_*fw* that is observed in a direction (e.g., a direction, in which a finger is inserted, or the z-axis direction) of a front surface of the smart ring device 100, and an outer rear side wall that is observed in a direction of a rear surface of the smart ring device 100.

The outer front side wall 110_*fw* may have the same shape and size as those of the outer rear side wall. The outer front side wall 110_*fw* may include portions that extend in a direction that is perpendicular to the center Cent_P at a plurality of points (or circular bands) of the first inner part of the outer structure 110 observed from the front. As an example, at least a portion of the outer front side wall 110_*fw* has a circular band shape, and may be formed from a direction of the first outer part 110_*cv* of the outer structure 110 to a direction of the first inner part of the outer structure 110. The outer front side wall 110_*fw* may define at least a portion of an inner space (or a recess or a groove, in which at least a portion of an inner element may be seated) of the outer structure 110 may be mounted together with the outer rear side wall and the first inner part of the outer structure 110. The outer rear side wall may have the same shape and size as those of the outer front side wall 110_*fw*. As an example, the outer rear side wall may include portions that extend in a direction that is perpendicular to the center Cent_P at a plurality of points of the first outer part 110_*cv* of the outer structure 110 observed from the rear surface (e.g., the −z-axis direction). The outer rear side wall may be disposed at a position that is moved in the z-axis direction by a width (e.g., a length in the z-axis direction) of the outer structure 110 with respect to the forward direction. As an example, the outer rear side wall may form a recess or groove together with the outer front side wall 110_*fw* and the first inner part of the outer structure 110 in a circumferential direction. At least a portion of an internal element may be disposed in the recess or groove. According to an embodiment, at least a portion of the internal element and at least a portion of the inner structure 120 may be disposed in the recess or groove.

The inner structure 120 may include a second outer part and an inner part 120_*cv* (or an inner peripheral curved surface, an inner peripheral surface, an inner part, an inner curved surface, or an inner bottom surface). At least a portion of the second outer part of the inner structure 120 may be defined by an inner peripheral space (e.g., a first inner part of the outer structure 110, the outer front side wall 110_*fw*, and the outer rear side wall, and may be disposed in a recess or groove formed in the whole or a portion of the circumference) of the outer structure 110. At least a portion of the second outer part of the inner structure 120 may include an injection-molded material that is formed through an injection-molding process, and may be disposed to fill at least a portion of the inner peripheral space. Correspondingly, the second outer part of the inner structure 120 may have an irregular shape corresponding to the shape of the inner peripheral space of the outer structure 110 or the inner element disposed in the inner peripheral space. The front surface of the second outer part of the inner structure 120 may be connected to the outer front side wall 110_*fw* of the outer structure 110. When observed from the z-axis direction, the front surface of the second outer part of the inner structure 120 may have a height that is substantially the same as or similar to the height of the outer front side wall 110_*fw* of the outer structure 110. The rear surface of the second outer part of the inner structure 120 may be connected to the outer rear side wall of the outer structure 110, and when observed from the −z-axis direction, the rear surface of the second outer part of the inner structure 120 may have a height that is substantially the same as or similar to the height of the outer rear side wall of the outer structure 110.

A second inner part 120_*cv* of the inner structure 120 may include a portion observed outward from the center Cent_P. The second inner part 120_*cv* of the inner structure 120 may have a circular peripheral shape. The second inner part 120_*cv* of the inner structure 120 may include uniformly formed areas, except for portions disposed in the protruding structures 131, 132, and 133 according to an embodiment. At least a portion of the second inner part 120_*cv* of the inner structure 120 may contact at least a portion of the finger when being mounted on the user's finger. Alternatively, at least a portion of the second inner part 120_*cv* of the inner structure 120 may define a gap (or an air gap) that is spaced from the skin of the finger according to the shape or characteristics of the finger.

The protruding structures 131, 132, and 133 may include, for example, a first protruding structure 131, a second protruding structure 132, and a third protruding structure 133. The third protruding structure 133 may be disposed between the first protruding structure 131 and the second protruding structure 132. According to an embodiment, the first protruding structure 131 and the second protruding structure 132 may be located at a first distance from the third protruding structure 133. For example, with respect to the third protruding structure 133, the first protruding structure 131 and the second protruding structure 132 may be disposed to be symmetrical to each other.

The first protruding structure 131 may be disposed on a left side with respect to an x-axis imaginary line that passes through the center Cent_P in a longitudinal direction, and may be disposed (or formed) on the second inner part 120_*cv* of the inner structure 120 that is spaced apart from the third protruding structure 133 by a first distance in the leftward direction. The first protruding structure 131 may protrude from the second inner part 120_*cv* of the inner structure 120 by a height pre-designed in a direction of the center Cent_P. The circumferential length (e.g., the length in the direction, in which the second inner part 120_*cv* of the inner structure 120 extends while forming a circle) of the first protruding structure 131 may be formed greater than the circumferential length of the third protruding structure 133. At least a portion of the first protruding structure 131 may include a curved surface.

The size of a surface of the first protruding structure 131, which is located close to the second inner part 120_cv of the inner structure 120, may be greater than the size of a surface that is located distant from the second inner part 120_cv of the inner structure 120. The first protruding structure 131 may include a shape, in which the size of the cross section gradually decreases as it goes from the inner curved surface in the direction of the center Cent_P. The size of the first protruding structure 131 may be the same as the size (or the size of the surface that contacts the second inner part 120_cv of the inner structure 120) of the surface located close to the second inner part 120_cv of the inner structure 120 and the size (or the size of the surface of an upper end or a ceiling of the first protruding structure 131) of the surface located distant from the second inner part 120_cv of the inner structure 120 may be the same. At least a portion of the first protruding structure 131 may be rounded. As an example, at least a portion of the first protruding structure 131, which faces the z-axis direction or the −z-axis direction, may be rounded. The first protruding structure 131 may be formed of the same material as the material of the inner structure 120. The first protruding structure 131 may be formed of a material having a different transparency from that of the inner structure 120. The first protruding structure 131 may be formed together in a process of forming the inner structure 120. The first protruding structure 131 may be generated through an additional process after the inner structure 120 is formed (or after the inner structure 120 is formed through an injection-molding process).

When observed from the center Cent_P toward the outside of the smart ring device 100, the first protruding structure 131 may be disposed to at least partially overlap a first position, in which the first light receiving element 150_r1 is disposed, and a second position, in which the first light emitting element 151_t1 (or the first light emitting element) is disposed. The first protruding structure 131 may serve to transmit a signal irradiated by the first light emitting element 151_t1 to a finger, and transmit a signal reflected from the inside or outside of the finger to the first light receiving element 150_r1.

In this regard, with respect to a direction from the center Cent_P toward the outer structure 110, in which the first light receiving element 150_r1 is disposed, the first part 131_1p of the first protruding structure 131 may be disposed at a position, in which at least a portion thereof overlaps the first light receiving element 150_r1 disposed in the first position. An extent of the first part 131_1p on the second inner part 120_cv of the inner structure 120 may be greater than an extent of the first light receiving element 150_r1. The first light receiving element 150_r1 may be formed to be wider than the extent of the first light emitting element 151_t1, and correspondingly, the extent of the first part 131_1p may be greater than the extent of the second part 131_2p. With respect to a direction from the center Cent_P toward the outer structure 110, in which the first light emitting element 151_t1 is disposed, the second part 131_2p of the first protruding structure 131 may be disposed at one position of the second inner part 120_cv of the inner structure 120, in which at least a portion thereof overlaps the first light emitting element 151_t1 disposed in the second position. The extent of the second part 131_2p (e.g., the extent observed when viewed from the center Cent_P toward the outer structure 110 or the extent formed on the second inner part 120_cv of the inner structure 120) may be different from the extent of the first part 131_1p. As an example, the extent of the second part 131_2p on the second inner part 120_cv of the inner structure 120 may be smaller than the extent of the first part 131_1p, in which the first light receiving element 150_r1 is disposed. The first part 1311p of the first protruding structure 131 and the second part 131_2p of the first protruding structure 131 may be connected to each other. A height of the first part 131_1p that protrudes from the second inner part 120_cv of the inner structure 120 toward a center Cent_P of the first part 131_1p and a height of the second part 131_2p may be formed substantially the same or similar. The first part 131_1p and the second part 131_2p may be divided by a first structure partition wall 131_w. At least a portion of the first structure partition wall 131_w may include an air layer (or an air gap).

According to various embodiments, the first protruding structure 131 may include a first structure partition wall 131_w disposed between the first part 131_1p and the second part 131_2p. The first structure partition wall 131_w may reduce crosstalk generated when a signal generated in the first light emitting element 151_t1 is directly transmitted to the first light receiving element 150_r1 disposed in the first part 131_1p without going through the inside or outside of the user's finger. The first structure partition wall 131_w may be formed of a material that is different from that of the first part 131_1p or the second part 131_2p of the first protruding structure 131. Furthermore, the first structure partition wall 131_w may be formed of a material having a transparency that is different from that of the first part 131_1p or the second part 131_2p of the first protruding structure 131. At least a portion of the first structure partition wall 131_w may include an elastic material (or a material having an elasticity of a reference value or more), or may have the same or similar flexibility as that of the first part 131_1p or the second part 131_2p of the first protruding structure 131.

The second protruding structure 132 may have substantially the same or similar shape, size, function, and material as compared with the first protruding structure 131, except for a structure that is positioned on the second inner part 120_cv of the inner structure 120. As an example, the second protruding structure 132 may be formed of the same material as that of the inner structure 120 or may be formed of a material having a higher transparency than that of the inner structure 120. A height (e.g., a length that protrudes from the second inner part 120_cv of the inner structure 120) and a thickness (e.g., a z-axis or −z-axis length), and a distance (e.g., a length in a circumferential direction of the second inner part 120_cv of the inner structure 120) of the second protruding structure 132 may be the same as or similar to the height, the thickness, and the distance of the first protruding structure 131. According to an embodiment, it may be disposed on a right side with respect to an x-axis imaginary line that passes through the center Cent_P in a longitudinal direction, and may be disposed (or formed) on the second inner part 120_cv of the inner structure 120 that is spaced apart from the third protruding structure 133 by a first distance in the rightward direction.

The second protruding structure 132 may include a third part 132_1p disposed in a different position of the second inner part 120_cv of the inner structure 120, which at least partially overlaps the third position, in which a second light receiving element 150_r2 is disposed, when viewed from the center Cent_P toward the outer structure 110 of the smart ring device 100, and a fourth part 132_2p disposed in one position of the second inner part 120_cv of the inner structure 120, which at least partially overlaps the fourth position, in which a second light emitting element 152_*t*1 (or the second light emitting element) is disposed when viewed from the center Cent_P toward the outer structure 110 of the smart ring device 100. The extent of the third part 132_1*p* (e.g., the extent observed when viewed from the center Cent_P toward the outer structure 110 or the extent formed on the second inner part 120_*cv* of the inner structure 120) may be different from the extent of the fourth part 132_2*p*. As an example, an extent of the third part 132_1*p* on the second inner part 120_*cv* of the inner structure 120 may be greater than an extent of the second light receiving element 150_*r*2. An extent of the fourth part 132_2*p* on the second inner part 120_*cv* of the inner structure 120 may be greater than an extent of the second light emitting element 152_*t*1. The second light receiving element 150_*r*2 may be formed to be greater than an extent of the second light emitting element 152_*t*1, and correspondingly, an extent of the third part 132_1*p* may be greater than an extent of the fourth part 132_2*p*. An extent of the third part 132_1*p* may be the same as or similar to an extent of the first part 131_1*p*, and an extent of the fourth part 132_2*p* may be the same as or similar to an extent of the second part 131_2*p*. The third part 132_1*p* of the second protruding structure 132 and the fourth part 132_2*p* of the second protruding structure 132 may be connected to each other. A height of the third part 132_1*p* that protrudes from the second inner part 120_*cv* of the inner structure 120 toward a center Cent_P of the third part 132_1*p* and a height of the fourth part 132_2*p* may be substantially the same as or similar to each other. The third part 132_1*p* and the fourth part 132_2*p* may be divided by a second structure partition wall 132_*w*. At least a portion of the second structure partition wall 132_*w* may include an air layer or an air gap.

According to an embodiment, the second protruding structure 132 may include a second structure partition wall 132_*w* disposed between the third part 132_1*p* and the fourth part 132_2*p*. The second structure partition wall 132_*w* may reduce crosstalk generated when a signal generated in the second light emitting element 152_*t*1 is directly transmitted to the second light receiving element 150_*r*2 disposed in the fourth part 132_2*p* without going through the inside or outside of the user's finger. The second structure partition wall 132_*w* may be formed of a material that is different from that of the third part 132_1*p* or the fourth part 132_2*p* of the second protruding structure 132, similar to the first structure partition wall 131_*w*. The second structure partition wall 132_*w* may be formed of a material having a different transparency from that of the third part 132_1*p* or the fourth part 132_2*p* of the second protruding structure 132. At least one of a material, a color, and a shape of the second structure partition wall 132_*w* may be the same as or similar to those of the first structure partition wall 131_*w*. At least a portion of the second structure partition wall 132_*w* may include an elastic material, or may have a flexibility that is the same as or similar to that of the third part 132_1*p* or the fourth part 132_2*p* of the second protruding structure 132.

The third protruding structure 133 may be disposed at a position that is spaced apart from the first protruding structure 131 by a first distance in the rightward direction, and at a position that is spaced apart from the second protruding structure 132 by a first distance in the leftward direction. The third protruding structure 133 may be disposed at a specific position of the second inner part 120_*cv* of the inner structure 120 corresponding to a middle of the first protruding structure 131 and the second protruding structure 132 with respect to an imaginary y-axis line that passes through the center Cent_P in the transverse direction. The third protruding structure 133 may be disposed to at least partially overlap a light emitting element 150_*t*2 (or the third light emitting element) with respect to a point (e.g., a point located on the imaginary x axis or −x axis) that passes from the center Cent_P in the longitudinal direction) of the outer structure 110. The third protruding structure 133 may include an extent that is greater than an extent of the light emitting element 150_*t*2. The third protruding structure 133 (e.g., at least one of a width, a thickness, and a length) may be formed smaller than the first protruding structure 131 or the second protruding structure 132 (e.g., at least one of a width, a thickness, and a length). The width or thickness of the third protruding structure 133 may be the same as or similar to the width or thickness of the first protruding structure 131 or the second protruding structure 132, and the length (e.g., a length that extends in the circumferential direction) of the third protruding structure 133 may be formed shorter than the length of the first protruding structure 131 or the second protruding structure 132.

The internal element may include a printed circuit board 140, a battery 170_*bat*, an antenna 190_*ant*, and a charging interface 170_*char*_*if*. At least a portion of the internal element may be disposed in a recess or groove (or an inner space) formed as at least a portion of the circumferential direction by an outer side wall (e.g., an outer front side wall 110_*fw* and an outer rear side wall) and an inner part of the outer structure 110.

As an example, the printed circuit board 140 includes first to fourth board parts 141, 142, 143, and 144, and the first to fourth board parts 141, 142, 143, and 144 may be disposed at different positions of the inner peripheral space of the outer structure 110, respectively. An upper portion of the printed circuit board 140 may be disposed to be covered by the inner structure 120. The first to fourth board parts 141, 142, 143, and 144 may be connected to each other. The printed circuit board 140 may include first to fourth board parts 141, 142, 143, and 144 configured in a rigid form or a hard form, and flexible parts that connect the first to fourth board parts 141, 142, 143, and 144. For example, the flexible parts may include a first flexible part that connects the first board part 141 and the second board part 142, a second flexible part that connects the second board part 142 and the third board part 143, and a third flexible part that connects the third board part 143 and the fourth board part 144. At least one electronic element may be disposed on the printed circuit board 140. As an example, a sensor part 150 may be disposed on the printed circuit board 140. Sensors (e.g., a first light emitting element 151_*t*1, a second light emitting element 152_*t*1, a light emitting element 150_*t*2, a first light receiving element 150_*r*1, and a second light receiving element 150_*r*2) disposed in the sensor part 150 may be divided and disposed on the first to fourth board parts 141, 142, 143, and 144.

According to an embodiment, the first board part 141 may be disposed between the battery 170_*bat* and the third board part 143. At least a portion of the first board part 141 may be disposed in the inner part of the outer structure 110 with a range of about 10 to 90 degrees (a section corresponding to the third quadrant in the xy coordinate) in the leftward direction with respect to an imaginary line from the center Cent_P toward the −x-axis direction. As an example, a temperature sensor 150_*temp*, a first light emitting element (e.g., including light emitting circuitry) 151_*t*1, a first light receiving element (e.g., including light receiving circuitry) 150_*r*1, a communication module (e.g., including communication circuitry) 190, a processor (e.g., including processing circuitry) 160, and a memory 180 may be disposed in the first board part 141. In the illustrated drawing, it is illustrated that a temperature sensor 150_*temp*, a first light emitting element 151_*t*1, and a first light receiving element 150_*r*1 are disposed on the first surface (e.g., the surface faces the center Cent_P) of the first board part 141, and a communication module 190, a processor 160, and a memory 180 are disposed on the second surface (e.g., the outer surface from the center Cent_P toward the outer structure 110 or the opposite surface of the first surface) of the first board part 141, the disclosure is not limited thereto. For example, the communication module 190, the processor 160, and the memory 180 may all be disposed on the front surface of the first board part 141, or only at least a portion thereof may be disposed on the rear surface of the first board part 141. At least a portion of the communication module 190, the processor 160, and the memory 180 may be disposed on another board part, or a configuration disposed on the other board part may be disposed on the first board part 141. In relation to the acquisition of a biometric signal (or sensor signal) that is to be acquired through the user's finger, as the position of a specific tissue (e.g., blood vessels) disposed on the finger is disposed at a statistically specified position, the first light emitting element 151_*t*1 and the first light receiving element 150_*r*1 located in the first board part 141 may be fixed on the front surface (or a surface that faces the center) of the first board part 141.

According to an embodiment, the first light receiving element 150_*r*1 may be located within a range of about 50 to 70 degrees (e.g., 60 degrees) in the leftward direction with respect to an imaginary x axis or −x axis. According to an embodiment, the first light receiving element 150_*r*1 may be disposed at a position of the outer structure 110, which is rotated by about 60 degrees to the left side with respect to the imaginary x axis or −x axis, and may collect a signal that is introduced via a finger, for example, a signal in a first frequency band or a signal in a second frequency band. The communication module 190 may be electrically connected to an antenna 190_*ant*. As the first light emitting element 151_*t*1 irradiates a signal in a frequency band that is relatively shorter than that of the light emitting element 150_*t*2, it may be disposed closer to the first light receiving element 150_*r*1 than the light emitting element 150_*t*2.

According to an embodiment, the first protruding structure (e.g., protrusion) 131 may be disposed in the second inner part 120_*cv* of the inner structure 120, which covers at least a portion of the first board part 141. The first protruding structure 131 may include, for example, a first part 131_1*p* of the first protruding structure 131 disposed at the first position of the second inner part 120_*cv* of the inner structure 120 so that at least a portion thereof overlaps the first light receiving element 150_*r*1 with respect to the first direction from the center Cent_P toward a point of the outer structure 110, and a second part 131_2*p* of the first protruding structure 131 disposed at the second position of the second inner part 120_*cv* of the inner structure 120 so that at least a portion thereof overlaps the first light emitting element 151_*t*1. The first part 131_1*p* and the second part 131_2*p* may be connected to each other. The first structure partition wall 131_*w* may be disposed between the first part 131_1*p* and the second part 131_2*p*. Correspondingly, at least a portion of the first board part 141 may be disposed at a specific position of the outer structure 110, which overlaps the first protruding structure 131, with respect to the first direction. Alternatively, the first protruding structure 131 may be disposed to overlap the first board part 141 with respect to the first direction.

According to an embodiment, the second board part 142 may be disposed between the charging interface 170_*char*_*if* and the third board part 143. At least a portion of the second board part 142 may be disposed in the inner part of the outer structure 110 with a range of about 10 to 90 degrees (a section corresponding to the fourth quadrant in the xy coordinate) in the rightward direction with respect to an imaginary line from the center Cent_P toward the −x-axis direction. According to an embodiment, a second light emitting element 152_*t*1 and a second light receiving element 150_*r*2 may be disposed in the second board part 142. For example, to irradiate a signal (or light) to a specific tissue (e.g., a blood vessel) disposed on the finger of the user, the second light emitting element 152_*t*1 and the second light receiving element 150_*r*2 may be disposed on a front surface (e.g., a direction toward the center Cent_P) of the second board part 142 and a fourth quadrant in the xy coordinate system. For example, referring to a reference line that longitudinally passes through the center Cent_P of the smart ring device 100, at least a portion of the second board part 142 may be disposed to be symmetrical to the first board part 141 with respect to the third board part 143.

The second light receiving element 150_*r*2 may be located within a range of about 50 to 70 degrees (e.g., 60 degrees) in the rightward direction with respect to an imaginary −x axis or x axis. According to an embodiment, the second light receiving element 150_*r*2 may be disposed in a position of the outer structure 110, which is rotated by about 60 degrees in the rightward direction from the imaginary x axis or the −x axis to collect a signal in the first frequency band or a signal in the second frequency band that is reflected via the inside of the finger. As the second light emitting element 152_*t*1 irradiates a signal in a frequency band that is relatively shorter than that of the light emitting element 150_*t*2 similar to the first light emitting element 151_*t*1, it may be disposed closer to the second light receiving element 150_*r*2 than the light emitting element 150_*t*2.

According to an embodiment, the second protruding structure (e.g., protrusion) 132 may be disposed in the second inner part 120_*cv* of the inner structure 120, which covers at least a portion of the second board part 142. The second protruding structure 132 may include, for example, a third part 132_1*p* of the second protruding structure 132 disposed in the third position of the second inner part 120_*cv* of the inner structure 120 so that at least a portion thereof overlaps the second light receiving element 150_*r*2 with respect to the second direction from the center Cent_P toward a point of the outer structure 110, and a fourth part 132_2*p* of the second protruding structure 132 disposed in the fourth position of the second inner part 120_*cv* of the inner structure 120 so that at least a portion thereof overlaps the second light emitting element 152_*t*1. The third part 132_1*p* and the fourth part 132_2*p* may be connected to each other. The second structure partition wall 132_*w* may be disposed between the third part 132_1*p* and the fourth part 132_2*p*. Correspondingly, at least a portion of the second board part 142 may be disposed at a specific position of the outer structure 110, which overlaps the second protruding structure 131, with respect to the second direction. Alternatively, the second protruding structure 132 may be disposed to overlap the second board part 142 with respect to the second direction.

According to an embodiment, the third board part 143 may be disposed between the first board part 141 and the second board part 142. At least a portion of the third board part 143 may be disposed in one position of the outer structure 110 from the center Cent_P toward the −x-axis direction. The third board part 143 may include, for example, an inertia sensor 150_*gv*, a light emitting element 150_*t*2, and a sensor circuit 150_*con*. The light emitting element 150_*t*2 may be fixedly disposed on the front surface (e.g., one surface in a direction toward the center Cent_P) of the second board part 142. The inertia sensor 150_*gv* and the sensor circuit 150_*con* may be disposed on any one of the front surface or the rear surface of the third board part 143. The light emitting element 150_*t*2 may irradiate a signal (or a second signal) of a frequency band that is different from that of the first light emitting element 151_*t*1 or the second light emitting element 152_*t*1 toward the center Cent_P. For example, the light emitting element 150_*t*2 may irradiate a signal (or light) having a wavelength that is longer than that of the first light emitting element 151_*t*1 or the second light emitting element 152_*t*1.

According to an embodiment, the third protruding structure (e.g., protrusion) 133 may be disposed in the second inner part 120_*cv* of the inner structure 120, which covers at least a portion of the third board part 143. The third protruding structure 133, for example, may be disposed at a fifth position of the second inner part 120_*cv* of the inner structure 120 so that at least a portion thereof overlaps the light emitting element 150_*t*2 with respect to a third direction (e.g., the −x-axis direction that passes through the center) from the center Cent_P toward a point of the outer structure 110. A size of the third protruding structure 133 may be larger than that of the light emitting element 150_*t*2. At least a portion of the third board part 143 may be disposed in a specific position of the outer structure 110, which overlaps the third protruding structure 133, with respect to the third direction. Alternatively, the third protruding structure 133 may be disposed to overlap the third board part 143 with respect to the third direction.

According to an embodiment, the fourth board part 144 may be disposed between the second board part 142 and the battery 170_*bat*. For example, a power source circuit 170_*ic* may be disposed on the fourth board part 144. The power source circuit 170_*ic* may be electrically connected to the charging interface 170_*char_if*. The power source circuit 170_*ic* may be electrically connected to a charging circuit connected to the charging interface 170_*char_if*.

At least some of the components (or electronic elements) disposed in the first to fourth board parts 141, 142, 143, and 144 described above may be disposed in other board parts, or at least some components may be omitted. A new electronic element related to the operation of the smart ring device 100 may be added to at least one of the first to fourth board parts 141, 142, 143, and 144.

The battery 170_*bat* may supply power related to an operation of the smart ring device 100. In this regard, the battery 170_*bat* may be electrically connected to the power source circuit 170_*ic*. The battery 170_*bat* may be connected to a charging circuit for charging the battery 170_*bat*. The battery 170_*bat* may be connected to a charging circuit through the power source circuit 170_*ic*. The battery 170_*bat* may include a structure, in which at least a portion thereof may be seated on the inner part of the outer structure 110 of the smart ring device 100. As an example, the battery 170_*bat* may have a width and a thickness corresponding to a part of the inner space of the outer structure 110, and at least a portion thereof is bent or may be bent. Alternatively, the battery 170_*bat* is provided in a band shape, and at least a part thereof may be curved or bent while being seated on the inner part of the outer structure 110. During the assembly process, at least a portion of the battery 170_*bat* may be disposed to contact the inner part of the outer structure 110. At least a portion of the charging interface 170_*char_if* and at least a portion of the antenna 190_*ant* may be disposed on one surface (e.g., a surface that faces the center Cent_P) of the battery 170_*bat*. The battery 170_*bat* may supply charged electric power to the smart ring device 100 in response to the control of the power source circuit 170_*ic*, and may be charged with electric power received through the charging interface 170_*char_if* in response to the control of the power source circuit 170_*ic*.

The antenna 190_*ant* may be disposed to overlap at least a portion of the battery 170_*bat* disposed in the inner peripheral space of the outer structure 110 when viewed from a direction that faces the outer structure 110 while being connected to one side of the first board part 141. According to an embodiment, at least a portion of the antenna 190_*ant* may include a bent shape or be formed of a bendable material, and then, may be disposed on a partial area of the battery 170_*bat* to correspond to the curved shape of the battery 170_*bat*. A coating layer of a non-conductive material may be disposed on one surface (e.g., a surface that faces the center Cent_P direction) of the antenna 190_*ant*, or at least a portion of the inner structure 120 may be disposed thereon. A thickness of a portion of the inner structure 120, which covers the one surface of the antenna 190_*ant*, may be formed to be thinner than that of another area (e.g., an area, in which the inner structure 120 disposed to cover the printed circuit board 140 is disposed).

The charging interface 170_*char_if* may be used to charge the battery 170_*bat* in a wireless manner. The charging interface 170_*char_if* may be electrically connected to the power source circuit 170_*ic* disposed on the fourth board part 144. The charging interface 170_*char_if* may be electrically connected to the power source circuit 170_*ic* through a charging circuit that will be described in greater detail below with reference to FIG. 13, or may be electrically connected to the battery 170_*bat* through a charging circuit. At least a portion of the charging interface 170_*char_if* may include a bent shape or may be formed of a bendable material. At least a portion of the charging interface 170_*char_if* may be disposed on one surface (e.g., a surface in a direction that faces the center Cent_P of the smart ring device 100) of the bent battery 170_*bat*. A portion of the inner structure 120 may be disposed on at least a portion of a surface (e.g., a surface that faces the center Cent_P) of the charging interface 170_*char_if*. A portion of the inner structure 120 may be disposed to cover at least a portion of a surface of the charging interface 170_*char_if*. A thickness of a portion of the inner structure 120, which covers the one surface (e.g., a surface that faces the center Cent_P) of the charging interface 170_*char_if*, may be formed to be thinner than that of another area (e.g., an area, in which the inner structure 120 disposed to cover the printed circuit board 140 is disposed). A thickness of a portion of the inner structure, which covers one surface of the charging interface 170_*char_if*, may be the same as or similar to a thickness of a portion of the inner structure 120, which covers one surface of the antenna 190_*ant*.

According to various embodiments, the smart ring device 100 may further include a metallic material layer (e.g., a metal coating layer or a metal layer, a metal pattern layer) that covers the second inner part 120_*cv* of the inner structure 120. In a situation, in which the metallic material layer is disposed to cover the second inner part 120_*cv* of the inner structure 120, the metallic material layer may include a hole (or an opening) that is configured such that at least a portion (or a signal irradiation area of the light emitting elements included in the sensor part 150 or a signal collection area of the light receiving elements) of an area, in which the sensor part 150 is disposed, may be exposed toward the center Cent_P. Furthermore, the metallic material layer may include a hole (or an opening) that is configured such that at least a portion of the antenna 190_*ant* and the charging interface 170_*char_if* may be exposed toward the center Cent_P.

As described above, the smart ring device 100 according to an embodiment of the disclosure includes a sensor part 150 in relation to the operation of collection of biometric signals through a user's finger, and may include at least one protruding structure that covers the sensor part 150 while protruding from the second inner part 120_*cv* of the inner structure 120 toward the center Cent_P (or a center of the space, into which the finger is inserted) of the smart ring device 100 to remove or reduce the air gap between the finger and the sensor part 150. The at least one protruding structure may protrude toward the center Cent_P while being disposed to cover both the light emitting element and the light receiving element disposed adjacent to each other in relation to signal transmission and reception of signals in the first frequency band. As the first part 131_1*p* that covers the light receiving element and the second part 131_2*p* that covers the light emitting element are closely attached to a portion of the finger, the efficiency of transmission and collection of signals may be improved by removing or reducing the air gap between the finger and the sensor part 150, and generation of noise due to the air gap may be improved in the smart ring device 100 of the disclosure. In the above description, it is illustrated that two light emitting elements (e.g., the first light emitting element 151_*t*1 and the second light emitting element 152_*t*1) are disposed in relation to transmission of signals in the first frequency band, but the smart ring device 100 according to the disclosure is not limited thereto. For example, the smart ring device 100 according to an embodiment of the disclosure may include only one light emitting element (e.g., the first light emitting element 151_*t*1) or three or more light emitting elements in relation to transmission of signals in the first frequency band. In this case, the at least one protruding structure (e.g., a protruding structure disposed to cover the light emitting element and the light receiving element together) may include only one protruding structure or may include three or more protruding structures.

Figure 3:
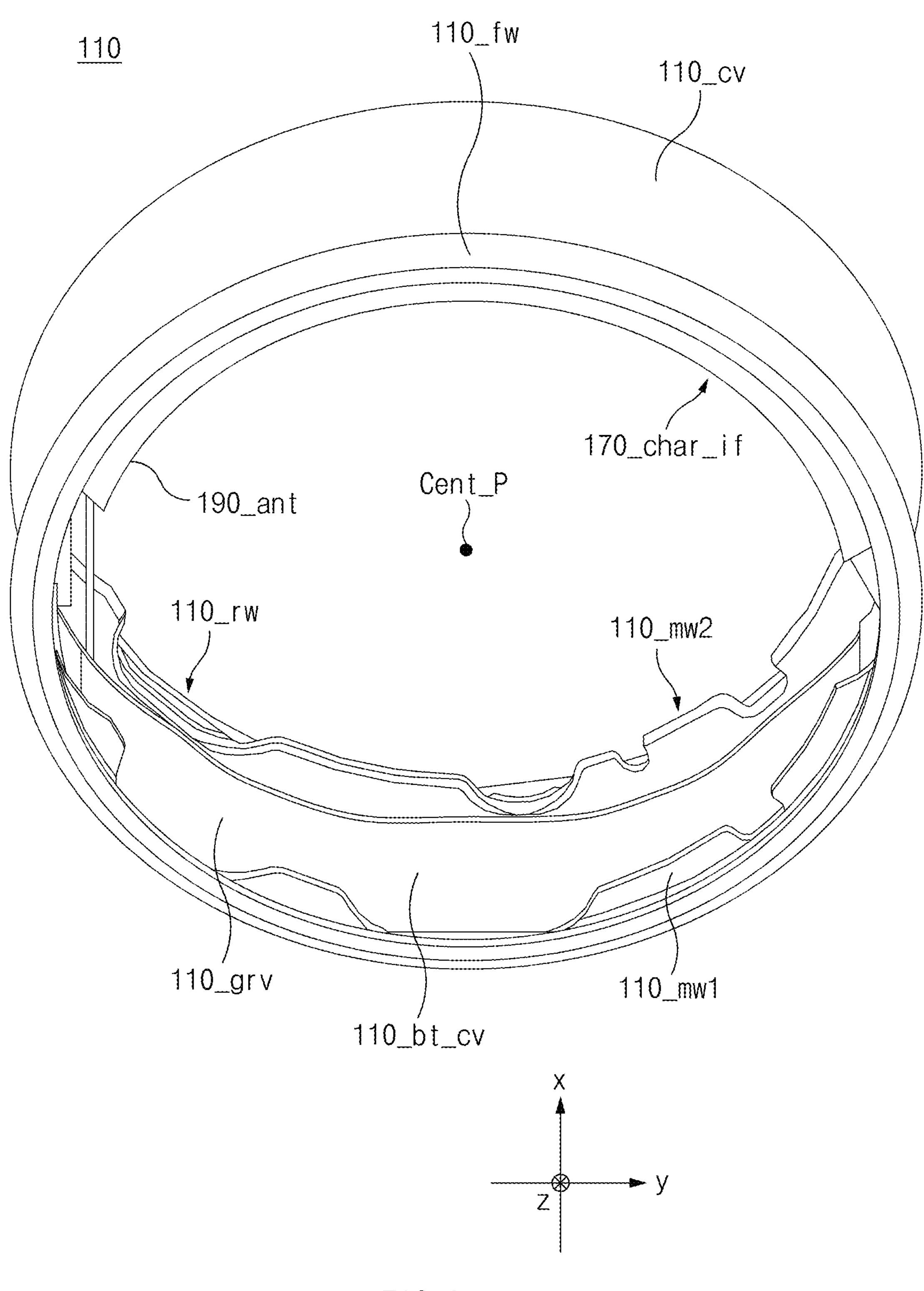
FIG. 3 is a perspective view illustrating an example of an outer structure and some internal elements of a smart ring device according to various embodiments.

FIG. 3 is a perspective view illustrating an example of an outer structure and some internal elements of a smart ring device according to various embodiments.

Referring to FIGS. 1, 2 and 3, the outer structure 110 according to an embodiment may include a first outer part 110_*cv* (or an outer part, an outer peripheral surface, an outer curved surface, or an outer surface), a first inner part 110_*bt_cv* (or an inner part, an inner surface, an inner curved surface, an inner curved part, or an inner bottom surface), an outer front side wall 110_*fw*, an outer rear side wall 110_*rw*, a first guide 110_*mw*1, and a second guide 110_*mw*2.

The first outer part 110_*cv* may have a specific width (e.g., a length that is smaller than a length of a user's finger) in the z-axis direction, and may include a circular band shape with respect to the center Cent_P of the smart ring device 100. The first outer part 110_*cv* may include a cylindrical periphery having an empty center with respect to a center Cent_P. The first outer part 110_*cv* may be formed of various materials. As an example, the first outer part 110_*cv* may be formed of a metal material. Various decorations, such as precious metals or jewelry, may be disposed on the first outer part 110_*cv*. As an example, the first outer part 110_*cv* may include various embossed parts (or embossed structures) and engraved parts (or engraved structures) related to identification of a position of the circular smart ring device 100. A display part (or at least one LED or lamp) may be disposed on the first outer part 110_*cv*. The display part is a display device, and may be electrically connected to the printed circuit board 140 described with reference to FIG. 2, and may display a screen in response to the control of the processor 160.

The first inner part 110_*bt_cv* may have a circular band shape or a band shape that has a specific width in a z-axis direction and extends in a circumferential direction with respect to a center Cent_P. The first inner part 110_*bt_cv* may be disposed in a position that is spaced apart from the first outer part 110_*cv* at a specific interval toward the center Cent_P. The first inner part 110_*bt_cv* and the first outer part 110_*cv* may divide an outer surface and an inner surface of the outer structure 110, respectively, and the inside of the first inner part 110_*bt_cv* and the first outer part 110_*cv* may be in a filled state. As another example, at least an empty space may be formed between the first inner part 110_*bt_cv* and the first outer part 110_*cv* of the outer structure 110. The first inner part 110_*bt_cv* may have a different circumferential length from that of the first outer part 110_*cv* (e.g., smaller), and may have the same center Cent_P.

The outer front side wall 110_*fw* may include a band structure that protrudes from a first periphery (e.g., a periphery of an inlet (e.g., a space, into which the finger is first inserted the smart ring device 100, or an opening) (or an inlet part), a periphery of an outlet (e.g., a space, from which the finger is first withdrawn from the smart ring device 100 or an opening) (or an outlet part), or a periphery in the −z-axis direction) of the first inner part 110_*bt_cv*, toward the center Cent_P. At least a portion (e.g., the side wall portions at various points) of the outer front side wall 110_*fw* may be formed to protrude in a direction that is perpendicular to the first inner part 110_*bt_cv* or the first outer part 110_*cv* (e.g., the outer parts at various points). At least a portion (e.g., the side wall portions of various points) of the outer front side wall 110_*fw* may protrude (or extend) toward a center point of an empty space corresponding to the inlet of the first inner part 110_*bt_cv* or the first outer part 110_*cv*. An extension length (e.g., a length that protrudes toward the center Cent_P) of the outer front side wall 110_*fw* may be smaller than a width (e.g., a length in the z-axis direction) of the first outer part 110_*cv* (e.g., the first inner part 110_*bt_cv*).

The outer rear side wall 110_*rw* may include a band structure that provides from a second periphery (a periphery of an outlet, into which the smart ring device 100 is inserted later when it is mounted on the finger, a periphery of an outlet, from which the finger is withdrawn later than in the inlet when the finger is withdrawn from the smart ring device, or a periphery in the z-axis direction) of the first inner part 110_*bt_cv*, toward the center Cent_P. The outer rear side wall 110_*rw* may be disposed in a position that is spaced apart from the outer front side wall 110_*fw* by a specific distance (e.g., a width of the outer structure 110) in the z-axis direction (or the −z-axis direction). The outer rear side wall 110_*rw* may have a structure that is the same as or similar to that of the outer front side wall 110_*fw*. As an example, at least a portion (e.g., the side wall portions at various points) of the outer rear side wall 110_*rw* may be formed to protrude in a direction that is perpendicular to the first inner part 110_*bt_cv* or the first outer part 110_*cv* (e.g., the outer parts at various points). Alternatively, at least a portion (e.g., the side wall portions of various points) of the outer rear side wall 110_*rw* may protrude (or extend) toward a center point of an empty space corresponding to the outlet of the first inner part 110_*bt_cv* or the first outer part 110_*cv*. An extension length (e.g., a length that protrudes toward the center Cent_P) of the outer rear side wall 110_*rw* may be smaller than a width (e.g., a length in the z-axis direction) of the first outer part 110_*cv* (e.g., the first inner part 110_*bt_cv*).

The first inner part 110_*bt_cv*, and the outer front side wall 110_*fw* and the outer rear side wall 110_*rw* that protrude from opposite peripheries of the first inner part 110_*bt_cv* may define at least a portion of an inner space 110_*grv* (or a recess or a groove) of the outer structure 110. For example, at least a portion of the battery 170_*bat*, the antenna 190_*ant*, and the charging interface 170_*char_if* described above with reference to FIG. 2 may be disposed in the inner space 110_*grv* of the outer structure 110.

The first guide 110_*mw*1 may extend from the outer front side wall 110_*fw* at a first periphery (e.g., an inlet periphery) of the first inner part 110_*bt_cv*. The first guide 110_*mw*1 may be located adjacent to the outer front side wall 110_*fw*, and may protrude from the bottom surface of the first inner part 110_*bt_cv* toward the center Cent_P or in a direction that is perpendicular to the bottom surface. According to an embodiment, the first guide 110_*mw*1 may be disposed to surround at least a portion of the first side surface of the printed circuit board 140 described with reference to FIG. 2. After the printed circuit board 140 is seated in the inner space 110_*grv* of the outer structure 110, the first guide 110_*mw*1 may serve as a support for the injection-molded product while the injection-molding process is performed. The first guide 110_*mw*1 may protrude from at least a portion of the outer front side wall 110_*fw* or at least one point of the bottom surface of the first inner part 110_*bt_cv* toward the center Cent_P.

The second guide 110_*mw*2 may extend from the outer rear side wall 110_*rw* at a second periphery (e.g., an outlet periphery) of the first inner part 110_*bt_cv*. The second guide 110_*mw*2 may be located adjacent to the outer rear side wall 110_*rw*, and may protrude from the bottom surface of the first inner part 110_*bt_cv* toward the center Cent_P or in a direction that is perpendicular to the bottom surface. In this regard, the second guide 110_*mw*2 may be disposed in a position that is spaced apart from the first guide 110_*mw*1 by a specific interval in the z-axis direction. The second guide 110_*mw*2 may have a shape that is different from that of the first guide 110_*mw*1 according to the shape of the printed circuit board 140 (or the shape of various electronic elements disposed on the printed circuit board 140). According to an embodiment, the second guide 110_*mw*2 may be disposed to surround at least a portion of the second side surface of the printed circuit board 140 described with reference to FIG. 2. After the printed circuit board 140 is seated in the inner space 110_*grv* of the outer structure 110, the second guide 110_*mw*2 may serve as a support for the injection-molded product together with the first guide 110_*mw*1 while the injection-molding process is performed. The second guide 110_*mw*2 may protrude from at least a portion of the outer rear side wall 110_*rw* or at least one point of the bottom surface of the first inner part 110_*bt_cv* toward the center Cent_P. The second guide 110_*mw*2 may be formed of the same material as that of the first guide 110_*mw*1. In an embodiment, at least a portion of the first guide 110_*mw*1 and the second guide 110_*mw*2 may have the same material as that of the outer structure 110. In an embodiment, the first guide 110_*mw*1 and the second guide 110_*mw*2 may be disposed in a portion of the outer structure 110. For example, the first guide 110_*mw*1 and the second guide 110_*mw*2 may be disposed an inner space 110_*grv*, other than an area, in which the antenna 190_*ant* and the charging interface 170_*char_if* are disposed, or a first inner part 110_*bt_cv* that defines the inner space 110_*grv*, other than an area, in which the battery 170_*bat* is disposed.

Figure 4:
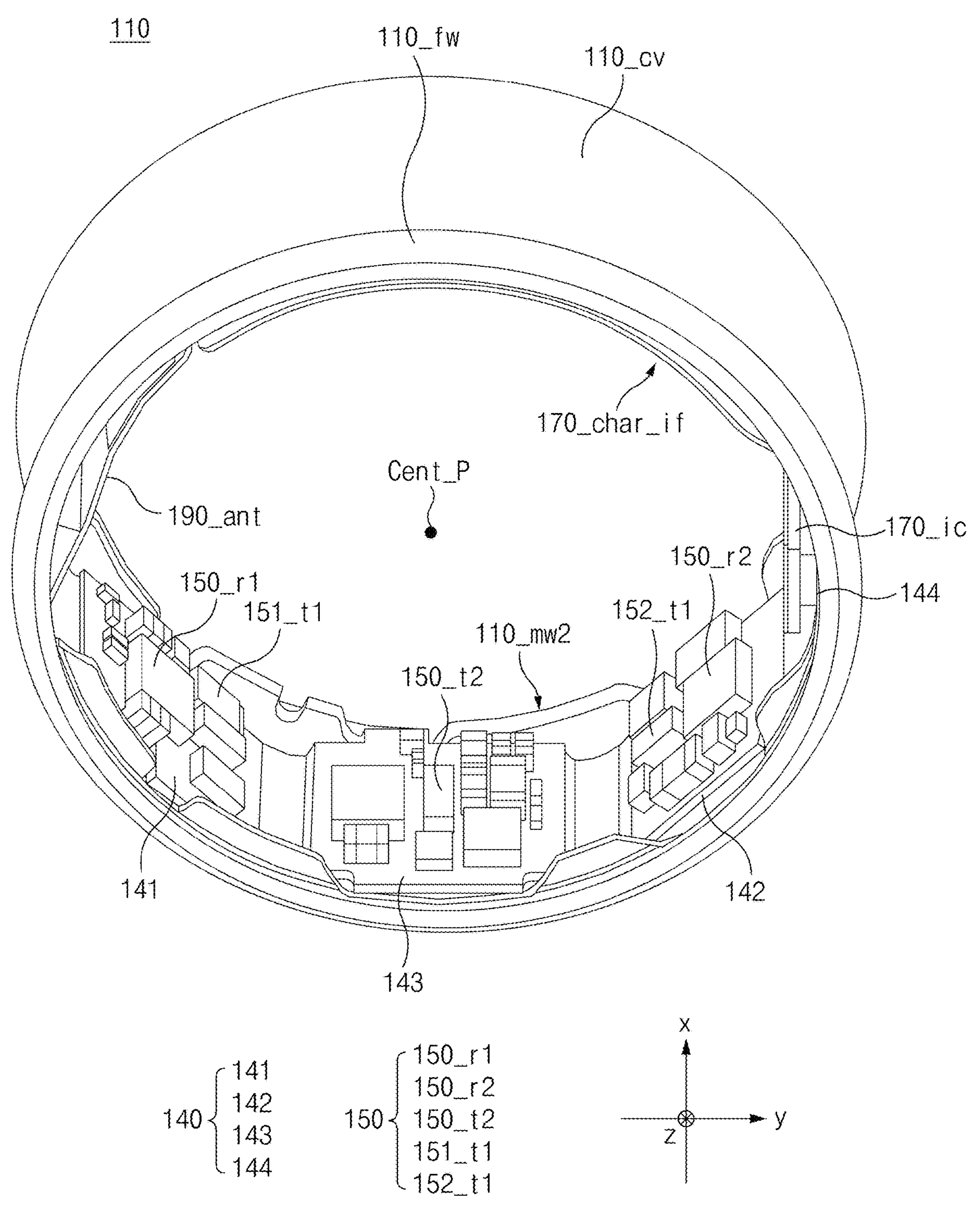
FIG. 4 is a perspective view illustrating an example of a coupled state of an outer structure and internal elements of a smart ring device, when observed in a first direction, according to various embodiments.
Figure 5:
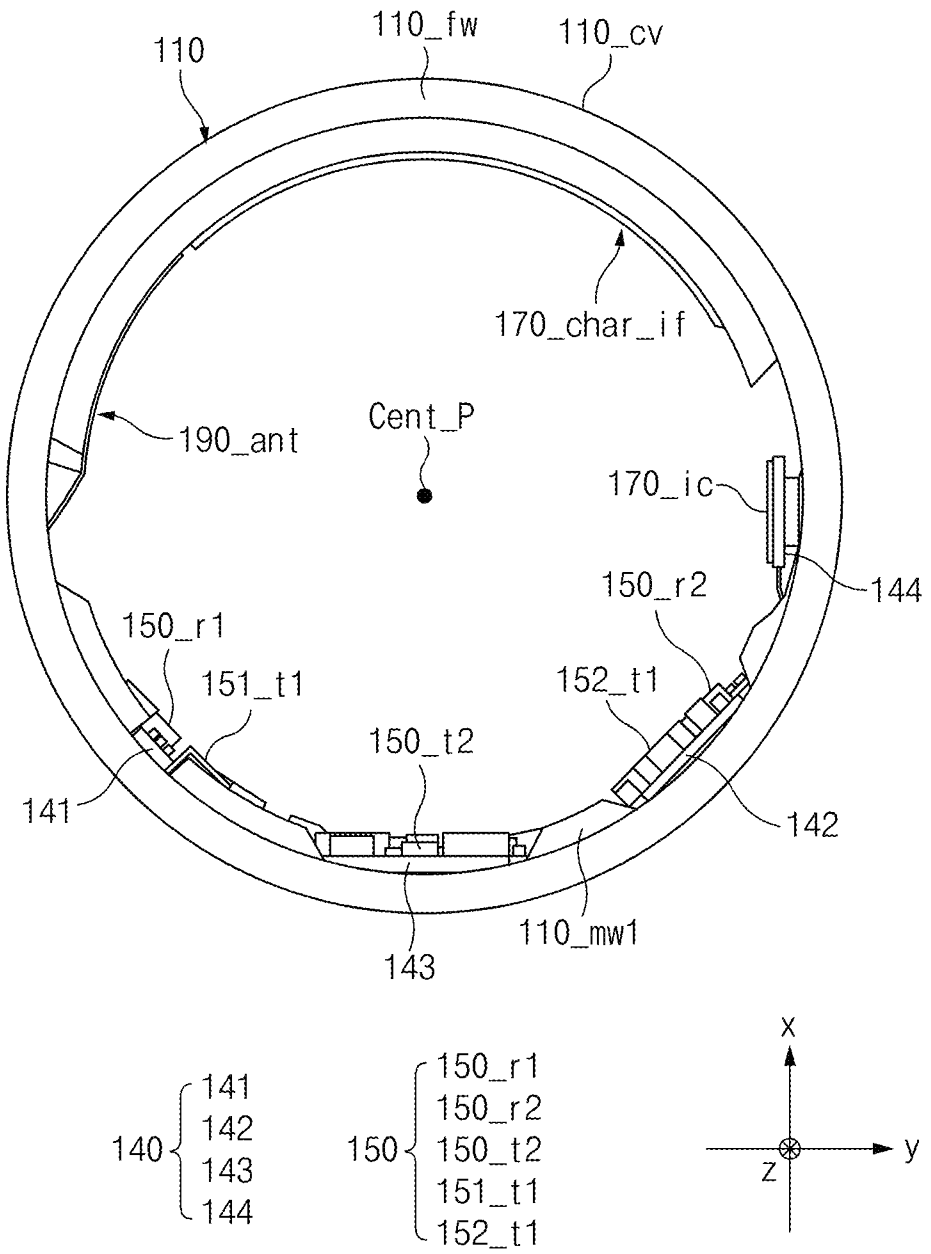
FIG. 5 is a diagram illustrating an example of a coupled state of an outer structure and internal elements of a smart ring device, when observed in a second direction, according to various embodiments.

FIG. 4 is a perspective view illustrating an example of a coupled state of an outer structure and internal elements of a smart ring device, when observed in a first direction, according to various embodiments. FIG. 5 is a diagram illustrating an example of a coupled state of an outer structure and internal elements of a smart ring device, when observed in a second direction, according to various embodiments.

Referring to FIGS. 1, 2, 3, 4, and 5, the printed circuit board 140 described with reference to FIG. 2 may be disposed in the inner space 110 (the inner space 110_*grv* of FIG. 3) formed in the outer structure 110. As the inner space 110_*grv* of the outer structure 110 is formed based on the first inner part 110_*bt_cv* including a curved surface, at least a portion of the printed circuit board 140 seated in the inner space 110_*grv* may include a bent shape or may be provided to be bent. According to various embodiments, at least a portion of the inner space 110_*grv* (or an opening part, a recess, a seating part, or a groove) may include a space including a first inner part 110_*bt_cv*, an outer front side wall (e.g., the outer front side wall 110_*fw* of FIG. 3), and an outer rear side wall (e.g., the outer rear side wall 110_*rw* of FIG. 3) or a space that is defined by the first inner part 110_*bt_cv*, the first guide 110_*mw*1, and the second guide 110_*mw*2. As an example, as described above, the printed circuit board 140, on which the sensor part 150 is disposed, includes first to fourth board parts 141, 142, 143, and 144, and the board parts may be connected to each other through flexible parts.

According to an embodiment, with reference to the illustrated drawing, a third board part 143 (or a board part, in which the light emitting element 150_*t*2 is disposed), in which the light emitting element 150_*t*2 is disposed, may be disposed in the inner space 110_*grv* directly on a lower side of the center Cent_P. Based on the third board part 143, a first board part 141 (or a board part, in which the first light emitting element 151_*t*1 and the first light receiving element 150_*r*1 are disposed) may be disposed in the left inner space 110_*grv*, and a second board part 142 (or a board part, in which the second light emitting element 152_*t*1 and the second light receiving element 150_*r*2 are disposed) may be disposed in the right inner space 110_*grv*.

The battery 170_*bat* illustrated in FIG. 2 may be disposed at an upper portion (e.g., a portion in the x-axis direction) of the outer structure 110, and the antenna 190_*ant* and the charging interface 170_*char_if* may be disposed on an inner surface (e.g., one surface that faces the center Cent_P) of the battery 170_*bat*. The antenna 190_*ant* may be electrically connected to a board part (e.g., the first board part 141), on which the communication module is disposed. The charging interface 170_*char_if* may be electrically connected to a board part (e.g., the fourth board part 144), on which the power source circuit 170_*ic* is disposed. The antenna 190_*ant*, and the battery 170_*bat* disposed between the charging interface 170_*char_if* and the first outer part 110_*cv* may be connected to a board part (e.g., the fourth board part 144), on which the power source circuit 170_*ic* is disposed.

The first to fourth board parts 141, 142, 143, and 144 of the printed circuit board 140 described above are ordered for description, and the order of the board parts may vary as necessary. For example, the third board part 143 may be named a first board part, and the first board part 141 disposed on the left side of the third board part 143 with reference to the illustrating drawing may be named a second board part 142, and the second board part 142 disposed on the right side of the third board part 143 may be named a third board part.

Figure 6:
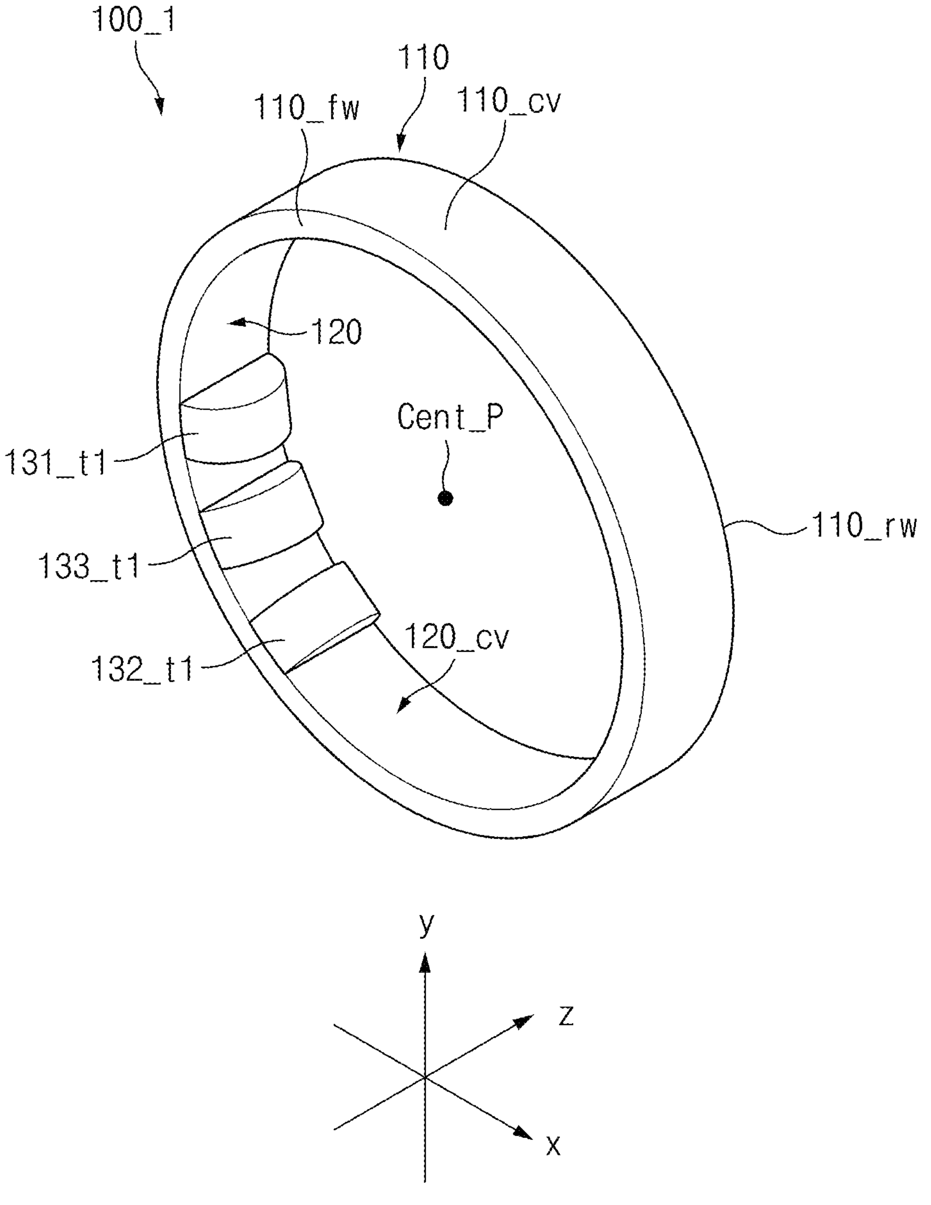
FIG. 6 is a perspective view illustrating an example of an exterior of an example smart ring device according to various embodiments.
Figure 7:
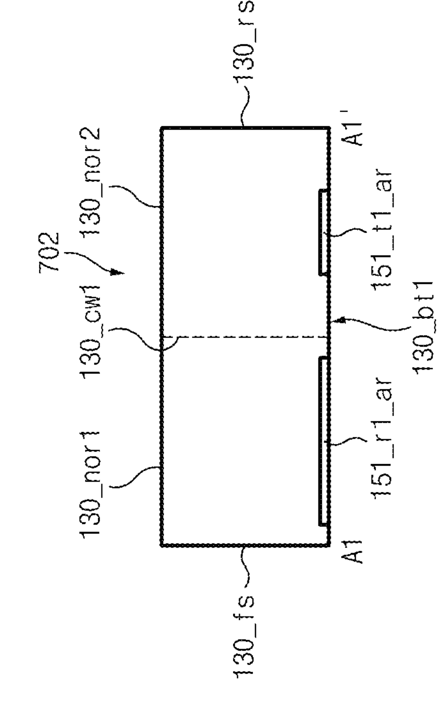
FIG. 7 is a diagram illustrating an example of a structure of an example protruding structure according to various embodiments.
Figure 7:
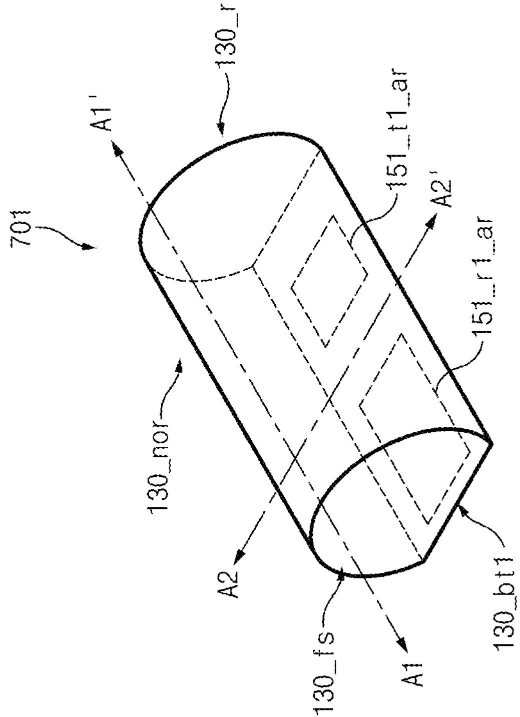
Figure 7:
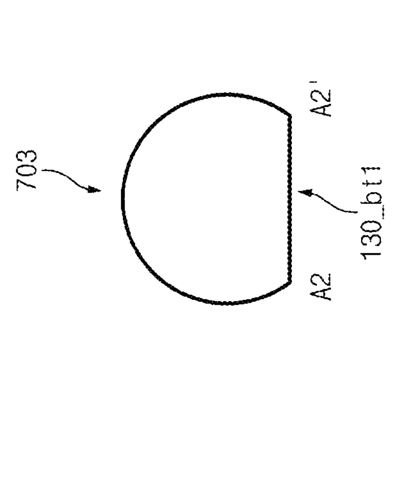

FIG. 6 is a perspective view illustrating an example of an exterior of a smart ring device according to various embodiments. FIG. 7 is a diagram illustrating an example of a structure of an example protruding structure according to various embodiments. The smart ring device 1001 illustrated in FIG. 6 is a view schematically illustrating protruding structures, an outer structure, and the second inner part 120_*cv* of the inner structure 120, among the structures related to the smart ring device 100 described above with reference to FIGS. 1, 2, 3, 4 and 5 (which may be referred to as FIGS. 1 to 5). The smart ring device 1001 may further include at least some of the other components of the smart ring device 100 described with reference to FIGS. 1 to 5.

Referring to FIGS. 1, 2, 3, 4, 5 and 6 (which may be referred to as FIGS. 1 to 6), the smart ring device 100_1 according to an embodiment may include an outer structure 110 and an inner structure 120, and may include protruding structures 131_*t*1, 132_*t*1, and 133_*t*1.

The outer structure 110 may have a structure that is the same as or similar to that of the outer structure 110 described with reference to FIGS. 1 to 5. For example, the outer structure 110 may include a first outer part 110_*cv*, an outer front side wall 110_*fw*, and an outer rear side wall 110_*rw*. Furthermore, the outer structure 110 may include the first inner part 110_*bt_cv*, the first guide 110_*mw*1, and the second guide 110_*mw*2 that are described with reference to FIGS. 4 and 5. At least a portion of the printed circuit board 140, in which the sensor part 150 is disposed, the battery 170_*bat*, the antenna 190_*ant*, and the charging interface 170_*char_if* may be disposed in an interior of the outer structure 110.

The inner structure 120 may include a structure that is the same as or similar to the inner structure 120 described with reference to FIGS. 1 to 5. For example, the inner structure 120 may include a second outer part that faces the first inner part 110_*bt_cv* of the outer structure 110 (or which at least a portion thereof contacts or that fills at least a portion of the inner space (the inner space 110_*grv* of FIG. 2), and a second inner part 120_*cv* that is connected to the second outer part and is disposed in a direction of the center Cent_P. The second outer part of the inner structure 120 may be disposed to cover at least a portion of the printed circuit board 140, in which the sensor part 150 is disposed, the battery 170_*bat*, the antenna 190_*ant*, and the charging interface 170_*char_if*. The second inner part 120_*cv* may include a smoothly formed curved surface, except for an area, in which the protruding structures 131_*t*1, 132_*t*1, and 133_*t*1 are disposed. At least a portion of the second inner part 120_*cv* may contact at least a portion of the outer skin of the finger while the user's finger is inserted into the smart ring device 100_1.

According to various embodiments, at least a portion of the second inner part 120_*cv* may include a structure (e.g., embossed parts or engraved parts) that is different from the surroundings. At least a portion of the inner structure 120 may be disposed to cover the sensor part 150 of the printed circuit board 140. In relation to transmission and reception of signals of the sensor part 150, the inner structure 120 may be formed of a material (e.g., transparent epoxy, or a nonconductive material, such as glass, silicon, or jewelry, which has a specified transparency) that enables transmission and reception of signals by the sensor part 150. The second outer part and the second inner part 120_*cv* of the inner structure 120 are classified according to the position of the outer structure 110 for convenience of description, and the second outer part and the second inner part 120_*cv* may define one body (or an injection-mold structure that is formed through at least one injection process).

According to various embodiments, the inner structure 120 may be formed of structures of different materials. As an example, the inner structure 120 may include a first part that is formed in the inner space 110_*grv* of the outer structure 110, in which the printed circuit board 140 is disposed, through an injection-molding process, and a second part that is disposed to cover at least a portion of the battery 170_*bat* (or the antenna 190_*ant*) and the charging interface 170_*char_if* in an interior of the outer structure 110. The first part and the second part of the inner structure 120 may be connected to each other to define one body, but in various embodiments, two structures may be separated from each other or may be adhered by a separate adhesive member.

According to an embodiment, the protruding structures 131_*t*1, 132_*t*1, and 133_*t*1 may be disposed on an inner part (e.g., a second inner part 120_*cv*) of the inner structure 120. The protruding structures 131_*t*1, 132_*t*1, and 133_*t*1 may include a curved part (or a curved surface) that protrudes in the z-axis direction or the −z-axis direction. According to an embodiment, the protruding structures 131_*t*1, 132_*t*1, and 133_*t*1 may be formed in a semicircular shape. For example, the protruding structures 131_*t*1, 132_*t*1, and 133_*t*1 may include a first protruding structure 131_*t*1, a second protruding structure 132_*t*1, and a third protruding structure 133_*t*1 that are disposed to be spaced apart from each other by a specific interval.

According to an embodiment, the first protruding structure 131_*t*1 may be disposed in an area of the second inner part 120_*cv* that covers at least a portion (e.g., a board part, on which the first light emitting element 151_*t*1 and the first light receiving element 150_*r*1 are disposed) of the first board part 141 of the printed circuit board 140 described in FIGS. 2, 4 and 5. It may be located in a partial area of the second inner part 120_*cv* in, among various directions that face the outer structure 110 from the center Cent_P, a first direction, in which the first protruding structure 131_*t*1 overlaps the first light emitting element 151_*t*1 and the first light receiving element 150_*r*1 described in FIG. 2.

According to an embodiment, the second protruding structure 132_*t*1 may be disposed in an area of the second inner part 120_*cv* that covers at least a portion (e.g., a board part, on which the second light emitting element 152_*t*1 and the second light receiving element 150_*r*2 are disposed) of the second board part 142 of the printed circuit board 140 described in FIGS. 2, 4 and 5. It may be located in a partial area of the second inner part 120_*cv* in, among various directions that face the outer structure 110 from the center Cent_P, a second direction, in which the second protruding structure 132_*t*1 overlaps the second light emitting element 152_*t*1 and the second light receiving element 150_*r*1 described in FIG. 2.

According to an embodiment, the third protruding structure 133_*t*1 may be disposed in an area of the second inner part 120_*cv* that covers at least a portion (e.g., a board part, on which the second light receiving element 150_*t*2 are disposed) of the third board part 141 of the printed circuit board 140 described in FIGS. 2, 4 and 5. It may be located in a partial area of the second inner part 120_*cv* in, among various directions that face the outer structure 110 from the center Cent_P, a third direction, in which the third protruding structure 131_*t*1 overlaps the second light receiving element 150_*t*2 described in FIG. 2. The third direction may be disposed between the first direction and the second direction. The first direction may be a direction that is symmetrical to the second direction with respect to the third direction.

According to an embodiment, the first protruding structure 131_*t*1 and the second protruding structure 132_*t*1 may have substantially the same or similar shape, size, and shape. The third protruding structure 133_*t*1 may be formed to have a different size from that of the first protruding structure 131_*t*1 or the second protruding structure 132_*t*1. As an example, the size of the bottom surface (e.g., the surface that contacts the second inner part 120_*cv*) of the third protruding structure 133_*t*1 may be smaller than the size of the bottom surface of the first protruding structure 131_*t*1 or the second protruding structure 132_*t*1. A length of the third protruding structure 133_*t*1 in the circumferential direction may be smaller than a length of the first protruding structure 131_*t*1 or the second protruding structure 132_*t*1 in the circumferential direction.

According to an embodiment, the inner structure 120 and the protruding structures 131_*t*1, 132_*t*1, and 133_*t*1 may be integrally formed. In this case, the area, in which the sensor part 150 is disposed, may include the sensor part 150, an inner structure part that covers the sensor part 150, and a protruding structure part that extends from the inner structure part and protrudes toward the center Cent_P than other parts of the inner structure.

As described above, the smart ring device 100_1 of the disclosure may be configured in a form, in which the protruding shapes of the protruding structures 131_*t*1, 132_*t*1, and 133_*t*1 are substantially the same (e.g., a form, in which the protrusion height gradually increases from the inlet to the outlet of the smart ring device 100 and then gradually decreases with respect to a maximum point).

At least one of the protruding structures 131_*t*1, 132_*t*1, and 133_*t*1 described above with reference to FIG. 6 may have a structure as illustrated in FIG. 7. As an example, among the protruding structures 131_*t*1, 132_*t*1, and 133_*t*1, the first protruding structure 131_*t*1 and the second protruding structure 132_*t*1 may have a structure of the protruding structure 130_*nor* illustrated in FIG. 7. In the following description, the protruding structures 131_*t*1, 132_*t*1, and 133_*t*1 illustrated in FIG. 6 will be named a protruding structure 130_*nor* for description.

Referring to FIGS. 1, 2, 3, 4, 5, 6 and 7, the protruding structure 130_*nor* may include a bottom surface 130_*bt*1, a first part 130_*nor*1, and a second part 130_*nor*2, and one surface of the first part 130_*nor*1 may correspond to a front surface 130_*fs* of the protruding structure 130_*nor*, and one surface of the second part 130_*nor*2 may correspond to a rear surface 130_*rs* of the protruding structure 130_*nor*. As in state 701, the protruding structure 130_*nor* may have a semi-cylindrical shape, a cut surface taken along cutting line A1-A1' may have a rectangular shape, and a cut surface taken along cutting line A2-A2' may have a semicircular shape. The protruding structure 130_*nor* may be formed of a rigid material, but the disclosure is not limited thereto. For example, at least a portion of the protruding structure 130_*nor* may be formed of an elastic material (or a flexible material).

The bottom surface 130_*bt*1 may include a surface that contacts the second inner part 120_*cv* of the inner structure 120. The bottom surface 130_*bt*1 may include a surface that extends from the second inner part 120_*cv* of the inner structure 120. On a lower side of the bottom surface 130_*bt*1, the first light receiving element area 150_*r*1_*ar*, in which the first light receiving element 150_*r*1 is disposed, and a first light emitting element area 151_*t*1_*ar*, in which the first light emitting element 151_*t*1 is disposed, may be disposed. When the bottom surface 130_*bt*1 corresponds to the second protruding structure 132_*t*1, among the protruding structures 131_*t*1, 132_*t*1, and 133_*t*1, a lower portion of the bottom surface 130_*bt*1 may include a second light emitting element area, in which the second light emitting element 152_*t*1 is disposed, and a second light receiving element area, in which the second light receiving element 150_*r*2 is disposed. The first light receiving element 150_*r*1 may be disposed at a lower portion (e.g., an interior of the inner structure 120 or a first space between the first outer part 110_*cv* of the outer structure 110 and the second inner part 120_*cv* of the inner structure 120) of the first light receiving element area 151_*r*1_*ar* to collect signals introduced from outside the first part 130_*nor*1. The first light emitting element 151_*t*1 may be disposed on a lower side of the first light emitting element area 151_*t*1_*ar* (e.g., an interior of the inner structure 120, or a second space between the first outer part 110_*cv* of the outer structure 110 and the second inner part 120_*cv* of the inner structure 120, the second space is located adjacent to the first space) to irradiate a signal (e.g., a signal in the first frequency band) through the second part 130_*nor*2.

According to an embodiment, the upper surface of the first part 130_*nor*1 and the upper surface of the second part 130_*nor*2 may at least partially contact the outer skin of the finger when the finger is inserted into the smart ring device 100_1. Correspondingly, the first light emitting element 151_*t*1 may irradiate a specific signal (e.g., a first frequency signal) to the outer skin of the finger that contacts the upper surface of the second part 130_*nor*2, and the first light receiving element 150_*r*1 may collect a reflection signal that is introduced through the outer skin of the finger, which contacts the upper surface of the first part 130_*nor*1. In this regard, the first part 130_*nor*1 and the second part 130_*nor*2 may be formed of a material having a specific transparency (e.g., a transparency of 80% or more, a transparency of 90% or 95% or more). The size of the first light receiving element area 151_*r*1_*ar* may be different from the size of the first light emitting element area 151_*t*1_*ar*. As an example, the size of the first light receiving element area 151_*r*1_*ar* may be larger than the size of the first light emitting element area 151_*t*1_*ar*.

The first partition wall 131_*cw*1 (e.g., the first structure partition wall 131_*w* or the second structure partition wall 132_*w*) may be disposed between the first part 130_*nor*1 and the second part 130_*nor*2. The first partition wall 131_*cw*1 may include a material layer different from that of the first part 130_*nor*1 and the second part 130_*nor*2. As an example, the first partition wall 131_*cw*1 may be formed of an opaque material. The first partition wall 131_*cw*1 may be formed of a flexible material or an elastic material similar to the material of the first part 130_*nor*1 and the second part 130_*nor*2, and may have different transparency. The first partition wall 131_*cw*1 may block a direct signal inflow between the first part 130_*nor*1 and the second part 130_*nor*2. As an example, the first partition wall 131_*cw*1 may prevent and/or reduce crosstalk caused by a situation, in which light irradiated from the first light emitting element 151_*t*1 is introduced directly into the first part 130_*nor*1 via the second part 130_*nor*2 without going through a finger.

The front surface 130_*fs* may include one surface of the protruding structure 130_*nor*. According to an embodiment, the front surface 130_*fs* may be disposed toward the inlet part of the first smart ring device 100_1. As an example, a coating layer of an opaque material may be formed on the front surface 130_*fs* to prevent and/or reduce light leakage to the front surface 130_*fs*. According to an embodiment, a corner of the front surface 130_*fs* may be rounded. Although a structure, in which the front surface 130_*fs* is vertically formed, is illustrated in state 702, it may be inclined toward the outlet part (or in the z-axis direction). The front surface 130_*fs* may include the same opaque material layer as that of the first partition wall 131_*cw*1.

The rear surface 130_*rs* may include another surface of the protruding structure 130_*nor*. According to an embodiment, the rear surface 130_*rs* may be disposed toward the outlet part of the first smart ring device 1001. For example, a coating layer of an opaque material may be formed on the rear surface 130_*rs* similar to the front surface 130_*fs* to prevent and/or reduce light leakage to the rear surface 130_*rs*. According to an embodiment, a corner of the rear surface 130_*rs* may be rounded similar to the front surface 130_*fs*. Although a structure, in which the rear surface 130_*rs* is vertically formed in state 702, is illustrated, it may be inclined toward the inlet part (or in the −z-axis direction). The rear surface 130_*rs* may include the same opaque material layer as that of the first partition wall 131_*cw*1.

Figure 8:
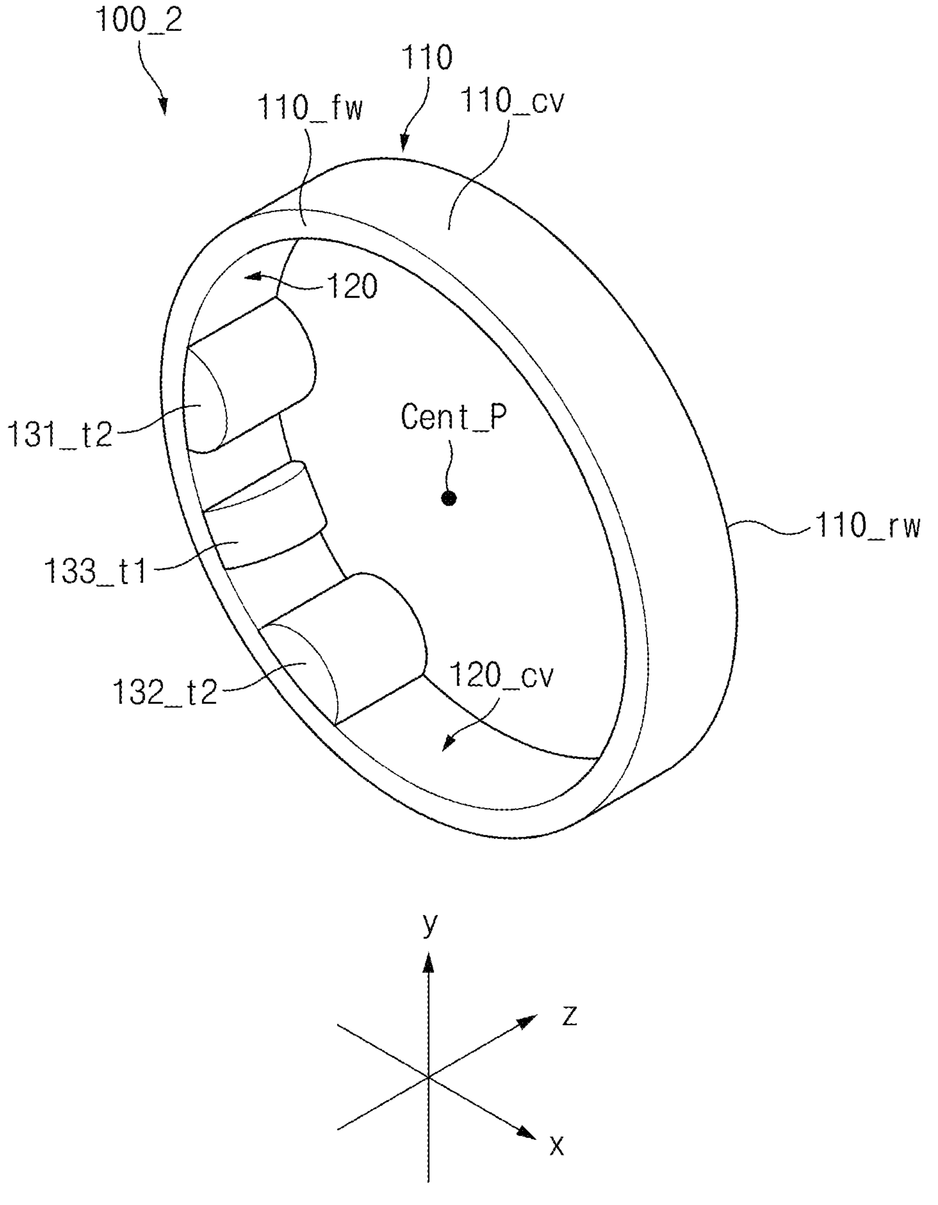
FIG. 8 is a perspective view illustrating an example of an exterior of an example smart ring device according to various embodiments.

FIG. 8 is a perspective view illustrating an example of an exterior of an example smart ring device according to various embodiments.

Referring to FIGS. 1, 2, 3, 4, 5, 6, 7 and 8, the smart ring device 100_2 may have substantially the same or similar structure and formation as those of the smart ring device 100_1 described above with reference to FIG. 6, except for a disposition form of a specific protruding structure. As an example, the smart ring device 1002 may include an outer structure 110, an inner structure 120, and protruding structures 131_*t*2, 132_*t*2, and 133_*t*1. The outer structure 110 includes a first outer part 110_*cv*, an outer front side wall 110_*fw*, and an outer rear side wall 110_*rw*, and the inner structure 120 may include a second inner part 120_*cv*. Additionally, the inner structure 120 may be disposed at at least a portion of the inner space of the outer structure 110. Because the outer structure 110 and the inner structure 120 described above may have the same configuration as those of the outer structure and the inner structure described with reference to FIGS. 1, 2, 3, 4, 5 and 6, a description thereof may be replaced or supplemented with the above description.

The protruding structures 131_*t*2, 132_*t*2, and 133_*t*1 may include a first protruding structure 131_*t*2, a second protruding structure 132_*t*2, and a third protruding structure 133_*t*1. Among the protruding structures 131_*t*2, 132_*t*2, and 133_*t*1, the third protruding structure 133_*t*1 may have the same shape, size, and position in the smart ring device 100 as those of the third protruding structure 133_*t*1 described above in FIG. 6.

The first protruding structure 131_*t*2 and the second protruding structure 132_*t*2 may have the same structure except for the disposition direction as compared with the first protruding structure 131_*t*1 and the second protruding structure 132_*t*1 described above with reference to FIG. 6. As an example, the first protruding structure 131_*t*2 and the second protruding structure 132_*t*2 may have a structure that is substantially the same as or similar to that of the protruding structure 130_*nor* described above with reference to FIG. 7. Accordingly, a detailed description of the first protruding structure 131_*t*2 and the second protruding structure 132_*t*2 may be replaced with the description related to FIG. 7.

As described above, the smart ring device 100_2 of the disclosure may have different protruding directions of the protruding structures 131_*t*2, 132_*t*2, and 133_*t*1. As an example, some (e.g., the first protruding structure 131_*t*2 and the second protruding structure 132_*t*2) of the protruding structures 131_*t*2, 132_*t*2, and 133_*t*1 included in the smart ring device 100_2 may have a structure (e.g., a form, in which the protrusion height gradually increases from one point, at which the protruding structure starts, in the circumferential direction and then gradually increases, and decreases with respect to a maximum point). Furthermore, some (e.g., the third protruding structure 133_*t*1) of the protruding structures 131_*t*2, 132_*t*2, and 133_*t*1 included in the smart ring device 100_2, as described above in FIG. 6, may be configured in a form (e.g., the protrusion height gradually increases from the inlet part to the outlet part of the smart ring device 100 and then gradually increases, and decreases at a maximum point), in which the protruding shape gradually changes as it goes in the z-axis direction.

Figure 9:
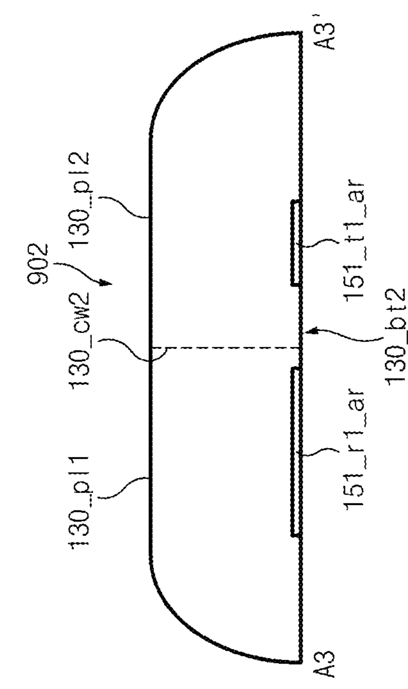
FIG. 9 is a diagram illustrating an example structure of an example protruding structure according to various embodiments.
Figure 9:
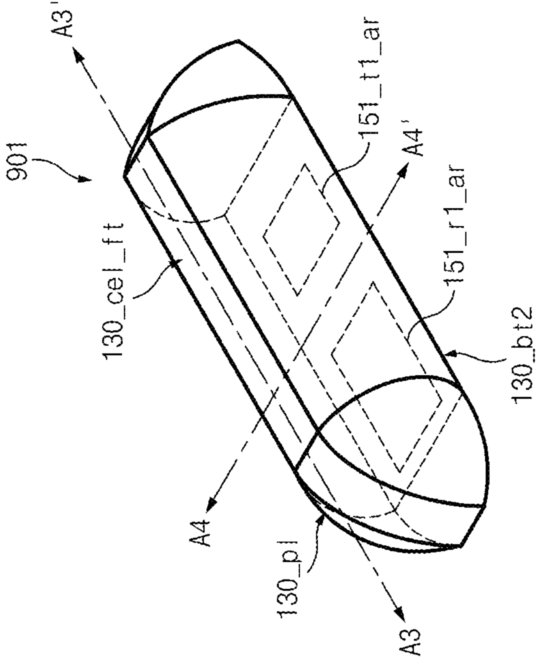
Figure 9:
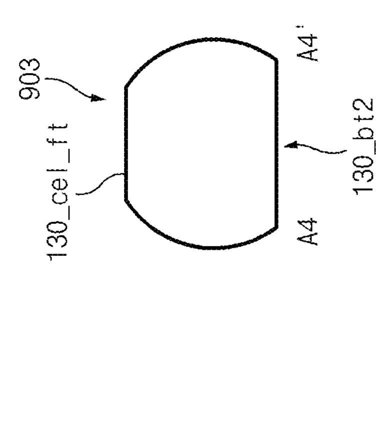

FIG. 9 is a diagram illustrating an example of a structure of an example protruding structure according to various embodiments. In FIG. 9, state 901 is a perspective view of the protruding structure 130_*p*1 that may be applicable to at least one of the protruding structures disposed in the smart ring device, state 902 illustrates a cross section of the protruding structure 130*p*1, taken along cutting line A3-A3' in the drawing of state 901, and state 903 illustrates a cross section of the protruding structure 130_*p*1, taken along cutting line A4-A4' in the drawing of state 901.

Referring to FIGS. 1, 2, 3, 4, 5, 6, 7, 8 and 9, the protruding structure 130_*p*1 may include a bottom surface 130_*bt*2, a first part 130_*p*11, a second part 130_*p*12, a second partition wall 130_*cw*2, and a first ceiling 130_*cel*_*ft*.

The bottom surface 130_*bt*2 may be formed to be flat. The bottom surface 130_*bt*2 may have a structure that is the same as or similar to the bottom surface described above with reference to FIG. 6. Considering a structure, in which the protruding structure 130_*p*1 is disposed to cover a first light receiving element (e.g., the first light receiving element 150_*r*1 of FIG. 2) and a first light emitting element (e.g., the first light emitting element 151_*t*1 of FIG. 2), the bottom surface 130_*bt*2 of the protruding structure 130_*p*1 may be formed to cover at least a portion of the first light receiving element (e.g., the first light receiving element 150_*r*1 of FIG. 2) and the first light emitting element (e.g., the first light emitting element 151_*t*1 of FIG. 2). In this regard, the bottom surface 130_*bt*2 may include a first light receiving element area 151_*r*1_*ar* that covers at least a portion of the first light receiving element 150_*r*1, and a first light emitting element area 151_*t*1_*ar* that covers at least a portion of the first light emitting element 151_*t*1. As an example, the protruding structure 130_*p*1 may be disposed to cover a second light receiving element (e.g., the light receiving element 150_*r*2 in FIG. 2) and a second light emitting element (e.g., the second light emitting element 152_*t*1 in FIG. 2). The description related to the bottom surface 130_*bt*2 may be replaced or supplemented with the description of the bottom surface described in FIG. 6.

The first part 130_*p*11 may be formed on a portion of the bottom surface 130_*bt*2. The first part 130_*p*11 may extend in one direction from the second partition wall 130_*cw*2. A size of a ceiling of the first part 130_*p*11 may be smaller than a size of the bottom surface of the first part 130_*p*11. Correspondingly, the shape of one end of the first part 130_*p*11 may include, for example, a shape in which one edge is curved as in state 902. A portion of the first part 130_*p*11 may have a shape corresponding to one of four pieces when divided into the x plane and the y plane with respect to the center of the sphere. At least a portion of the upper end of the first part 130_*p*11 may be formed to be flat. A first light receiving element 150_*r*1 (or a second light receiving element 150_*r*2) may be disposed under the first part 130_*p*11.

The second part 130_*p*12 may be formed on another portion of the bottom surface 130_*bt*2. The second part 130_*p*12 may extend from the second partition wall 130_*cw*2 in a direction (or an opposite direction) that is different from the one direction. A size of the ceiling of the second part 130_*p*12 may be smaller than a size of the bottom surface of the second part 130_*p*12. Correspondingly, the second part 130_*p*12, for example, may include a curved end on an opposite side (e.g., an opposite side to the one side of the first part 130_*p*11) as in state 902. A portion (e.g., one end shape) of the second part 130_*p*12 may have a shape corresponding to one of four pieces when divided into the x plane and the y plane with respect to the center of the sphere. At least a portion of the upper end of the second part 130_*p*12 may be formed to be flat, similar to the upper end of the first part 130_*p*11. The first light emitting element 151_*t*1 (or the second light emitting element 152_*t*1) may be disposed under the second part 130_*p*12. The size of the second part 130_*p*12 may be different from the size of the first part 130_*p*11. As an example, the size of the second part 130_*p*12 may be smaller than the size of the first part 130_*p*11.

A second partition wall 130_*cw*2 may be disposed between the first part 130_*p*11 and the second part 130_*p*12. The second partition wall 130_*cw*2 may include a material layer that is different from those of the first part 130_*p*11 and the second part 130_*p*12. As an example, the second partition wall 130_*cw*2 may be formed of a material that is the same as or similar to that of the first partition wall 130_*cw*1 described above with reference to FIG. 6. For example, similarly, the second partition wall 130_*cw*2 may be formed of an opaque material. The second partition wall 130_*cw*2 may be formed of a flexible material or an elastic material similar to the material of the first part 130_*p*11 and the second part 130_*p*12, and may have different transparency. The description of the second partition wall 130_*cw*2 may be replaced or supplemented with the description of the first partition wall 130_*cw*1 described with reference to FIG. 6.

The first ceiling 130_*cel*_*ft* may be formed to be flat. A width (e.g., a length in the circumferential direction) of the first ceiling 130_*cel*_*ft* may be smaller than a width (e.g., a length in the circumferential direction) of the bottom surface 130_*bt*2. As the first ceiling 130_*cel*_*ft* is formed to be flat by a specific width, a surface that contacts the outer skin of the finger may be further secured than a curved shape.

The protruding structure 130_*p*1 described in FIG. 9 may be applied to at least one of the protruding structures described in FIGS. 1, 2, 6, 7 and 8. It may be applied to at least one of a plurality of protruding structures disposed in the smart ring device 100. As an example, the protruding structure 130_*p*1 may be applied to at least one of a protruding structure disposed to cover at least a portion of the first light emitting element 151_*t*1 and the first light receiving element 150_*r*1, a protruding structure disposed to cover at least a portion of the second light emitting element 152_*t*1 and the second light receiving element 150_*r*2, or a protruding structure disposed to cover at least a portion of the light emitting element 150_*t*2.

Figure 10:
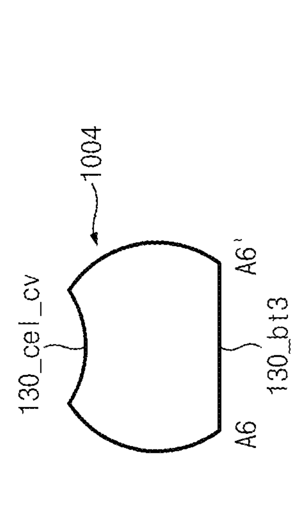
FIG. 10 is a diagram illustrating an example of a structure of an example protruding structure according to various embodiments.
Figure 10:
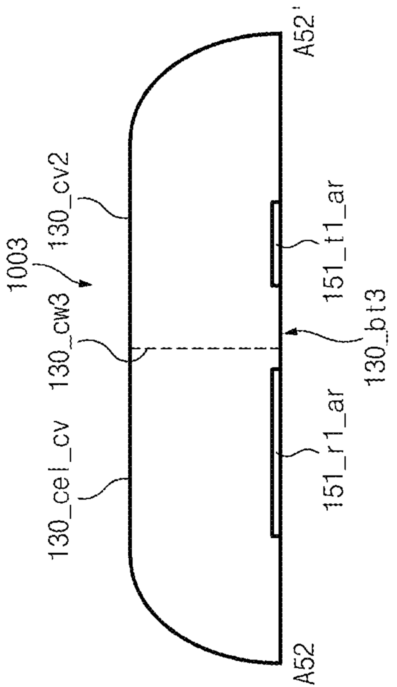
Figure 10:
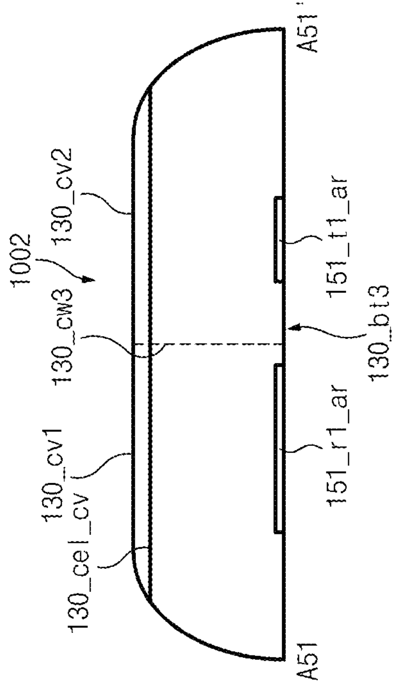

FIG. 10 is a diagram illustrating an example of a structure of an example protruding structure according to various embodiments. In FIG. 10, state 1001 illustrates a perspective view of the protruding structure 130_*cv* that may be applicable to at least one of the protruding structures disposed in the smart ring device, state 1002 illustrates a cross section of the protruding structure 130_*cv*, taken along cutting line A51-A51' in the drawing of state 1001, and state 1003 illustrates a cross section of the protruding structure 130_*cv*, taken along cutting line A52-A52' in the drawing of state 1001. State 1004 illustrates a cross section of the protruding structure 130_*cv*, taken along cutting line A6-A6' in the drawing of state 1001.

Referring to FIGS. 1, 2, 3, 4, 5, 6, 7, 8, 9 and 10, the protruding structure 130_*cv* of FIG. 10 may have the same structure as that of the protruding structure 130_*p*1 described in FIG. 9, except for the first ceiling 130_*cel*_*ft*. As an example, the protruding structure 130_*cv* may include a bottom surface 130_*bt*3, a first part 130_*cv*1, a second part 130_*cv*2, a third partition wall 130_*cw*3, and a second ceiling 130_*cel*_*cv*.

The bottom surface 130_*bt*3 may be formed to be flat. The bottom surface 130_*bt*3 may have a structure that is the same as or similar to the bottom surface described above with reference to FIGS. 6, 7, 8 and 9. For example, the bottom surface 130_*bt*3 of the protruding structure 130_*cv* may be formed to cover at least a portion of the first light receiving element (e.g., the first light receiving element 150_*r*1 of FIG. 2, hereinafter 150_*r*1) and the first light emitting element (e.g., the first light emitting element 151_*t*1 of FIG. 2, hereinafter 151_*t*1), or at least a portion of the second light receiving element (e.g., the second light receiving element 150_*r*2 of FIG. 2, hereinafter 150_*r*2) and the second light emitting element (e.g., the second light emitting element 152_*t*1 of FIG. 2, hereinafter 152_*t*1). In this regard, the bottom surface 130_*bt*3 may include a first light receiving element area 151_*r*1_*ar* that covers at least a portion of the first light receiving element 150_*r*1, and a first light emitting element area 151_*t*1_*ar* that covers at least a portion of the first light emitting element 151_*t*1. The bottom surface 130_*bt*3 may include a second light receiving element 150_*r*2 and a second light emitting element area that are disposed to cover the second light emitting element 152_*t*1. The description related to the bottom surface 130_*bt*3 may be replaced or supplemented with the description of the bottom surface described in FIG. 6 or FIG. 9.

The first part 130_*cv*1 may be formed on a portion of the bottom surface 130_*bt*3. A size of a ceiling of the first part 130_*cv*1 may be smaller than a size of the bottom surface of the first part 130_*cv*1. Correspondingly, the shape of one end of the first part 130_*cv*1 may include, for example, a shape in which one edge is curved as in state 1002 or state 1003. The upper end (e.g., the second ceiling 130_*cel*_*cv*1) of the first part 130_*cv*1 may include a shape that is engraved toward the bottom surface 130_*bt*3. At least a portion of the engraved shape may include a curved surface. A first light receiving element 150_*r*1 (or a second light receiving element 150_*r*2) may be disposed under the first part 130_*cv*1.

The second part 130_*cv*2 may be formed on another portion of the bottom surface 130_*bt*3. A size of the ceiling of the second part 130_*cv*2 may be smaller than a size of the bottom surface of the second part 130_*cv*2. The second part 130_*cv*2 may include, for example, a shape, in which the opposite end is curved as in state 1002 state or state 1003. At least a portion of the upper end of the second part 130_*cv*2 may be formed to be flat similar to the upper end of the first part 130_*cv*1. The first light emitting element 151_*t*1 (or the second light emitting element 152_*t*1) may be disposed under the second part 130_*cv*2. The size of the second part 130_*cv*2 may be different from the size of the first part 130_*cv*1. As an example, the size of the second part 130_*cv*2 may be smaller than the size of the first part 130_*cv*1.

A third partition wall 130_*cw*3 may be disposed between the first part 130_*cv*1 and the second part 130_*cv*2. The third partition wall 130_*cw*3 may include a material layer that is different from those of the first part 130_*cv*1 and the second part 130_*cv*2. As an example, the third partition wall 130_*cw*3 may be formed of a material that is the same as or similar to that of the first partition wall 130_*cw*1 described in FIG. 6 or the second partition wall 130_*cw*2 described in FIG. 9. For example, similarly, the third partition wall 130_*cw*3 may be formed of an opaque material. The third partition wall 130_*cw*3 may be formed of a flexible material or an elastic material similar to the material of the first part 130_*cv*1 and the second part 130_*cv*2, and may have different transparency. The description of the third partition wall 130_*cw*3 may be replaced or supplemented with the description of the first partition wall 130_*cw*1 described above with reference to FIG. 6 or the description of the second partition wall 130_*cw*2 described with reference to FIG. 9.

The second ceiling 130_*cel_cv* may have a shape that is engraved toward the bottom surface. The engraved depth of the second ceiling 130_*cel_cv* may be smaller than the height of the first part 130_*cv*1 from the bottom surface 130_*bt*3 toward the center Cent_P of the smart ring device 100 or the height of the second part 130_*cv*2. The cross-section of the engraved shape of the second ceiling 130_*cel_cv* may include a curve as in state 1004. A curvature of the engraved curve in one cross-section of the second ceiling 130_*cel_cv* may vary depending on the size of the smart ring device 100. As an example, the curvature of the curve of the second ceiling 130_*cel_cv* may decrease (or be gentler) as the size of the smart ring device 100 increases, and increase as the size of the smart ring device 100 decreases.

The protruding structure 130_*cv* described in FIG. 10 may be applied to at least one of the protruding structures described in FIGS. 1, 2, 6, 7 and 8. It may be applied to at least one of a plurality of protruding structures disposed in the smart ring device 100. As an example, the protruding structure 130_*cv* may be applied to at least one of a protruding structure disposed to cover at least a portion of the first light emitting element 151_*t*1 and the first light receiving element 150_*r*1, a protruding structure disposed to cover at least a portion of the second light emitting element 152_*t*1 and the second light receiving element 150_*r*2, or a protruding structure disposed to cover at least a portion of the light emitting element 150_*t*2. There may be various directions, in which the protruding structure 130_*cv* is applied to the smart ring device 100. For example, the protruding structure 130_*cv* may be applied to the smart ring device 100 in a protruding form (e.g., a form, in which the protruding height is changed from the center Cent_P of the smart ring device 100 in the circumferential direction), such as the first protruding structure 131_*t*2 illustrated in FIG. 8, or may be applied to the smart ring device in a protruding form (e.g., a form, in which the protruding height is changed from the center Cent_P of the smart ring device 100 in a direction from the inlet part to the outlet part), such as the third protruding structure 133_*t*1.

Figure 11:
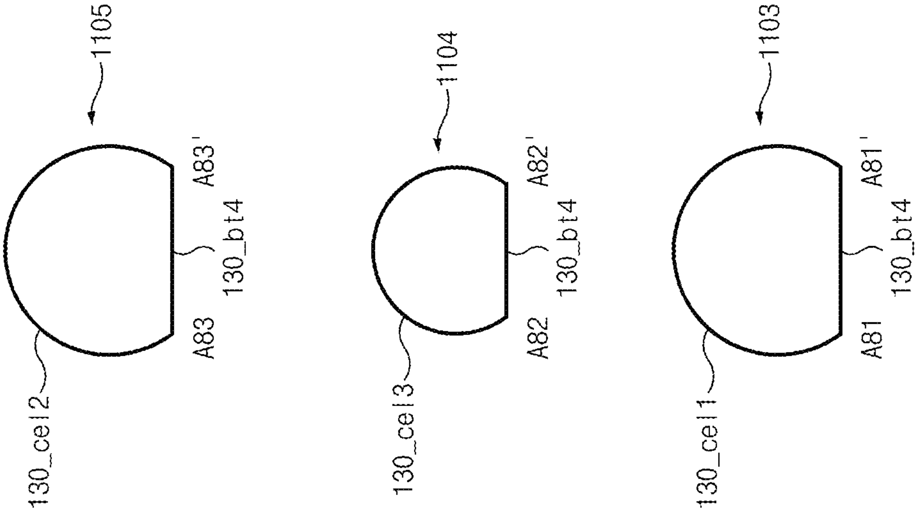
FIG. 11 is a diagram illustrating an example of a structure of an example protruding structure according to various embodiments.
Figure 11:
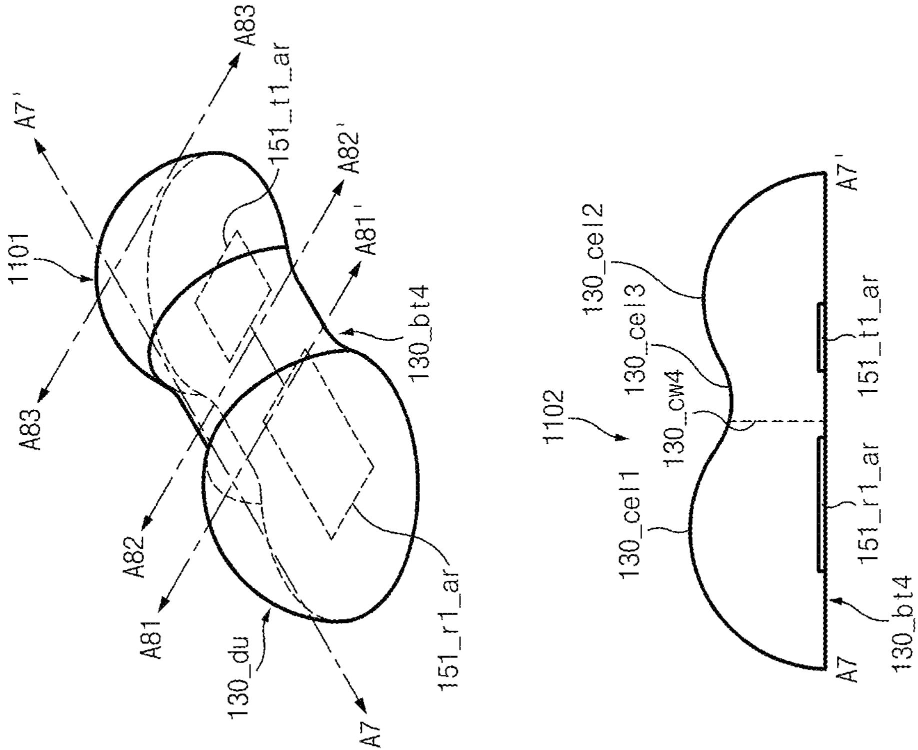

FIG. 11 is a diagram illustrating an example protruding structure according to various embodiments. In FIG. 11, state 1101 illustrates a perspective view of the protruding structure 130_*du* that may be applicable to at least one of the protruding structures disposed in the smart ring device, state 1102 illustrates a cross section of the protruding structure 130_*du*, taken along cutting line A7-A7' in the drawing of state 1101, and state 1103 illustrates a cross section of the protruding structure 130_*du*, taken along cutting line A81-A81' in the drawing of state 1101. State 1104 illustrates a cross section of the protruding structure 130_*du*, taken along cutting line A82-A82' in the drawing of state 1101, and state 1105 illustrates a cross section of the protruding structure 130_*du*, taken along a line of A83-A83' in the drawing of state 1101.

Referring to FIGS. 1, 2, 3, 4, 5, 6, 7, 8, 9, 10 and 11, according to an embodiment, the protruding structure 130_*du* may include a bottom surface 130_*bt*4, a first part 130_*cel*1, a second part 130_*cel*2, a third part 130_*cel*3, and a fourth partition wall 130_*cw*4.

The bottom surface 130_*bt*4 may have a structure that is the same as or similar to the bottom surface described above with reference to FIGS. 6, 7, 8, 9 and 10. For example, the bottom surface 130_*bt*4 of the protruding structure 130_*du* may include a first light receiving element area 151_*r*1_*ar* that covers at least a portion of the first light receiving element (e.g., the first light receiving element 150_*r*1 of FIG. 2, hereinafter 150_*r*1), and a first light emitting element area 151_*t*1_*ar* that covers at least a portion of the first light emitting element (e.g., the first light emitting element 151_*t*1 of FIG. 2, hereinafter, 151_*t*). The description related to the bottom surface 130_*bt*4 may be replaced or supplemented with the description of the bottom surface described in FIG. 6, FIG. 9, or FIG. 10.

The first part 130_*cel*1 may be formed on a portion of the bottom surface 130_*bt*4. The first part 130_*cel*1 may have, for example, a shape that is convex from the bottom surface toward the center Cent_P of the smart ring device 100. For example, the first part 130_*cel*1 may have a shape, in which the height from the bottom surface 130_*bt*4 gradually increases with respect to one direction (e.g., the z-axis direction of FIG. 5) or an opposite direction (e.g., the circumferential direction of the smart ring device 100 illustrated in FIG. 5) and then gradually decreases from the bottom surface 130_*bt*4 with respect to an inflection point (or the maximum point). A first light receiving element 150_*r*1 (or a second light receiving element 150_*r*2) may be disposed under the first part 130_*cel*1. One periphery of the first part 130_*cel*1 may be connected to a fourth partition wall 130_*cw*4.

The second part 130_*cel*2 may be formed on another portion of the bottom surface 130_*bt*4. The second part 130_*cel*2 may have, for example, a shape that is convex from the bottom surface toward the center Cent_P of the smart ring device 100. The convex shape of the second part 130_*cel*2 may be the same as or similar to the convex shape of the first part 130_*cel*1. The second part 130_*cel*2 may be convex similarly to the first part 130_*cel*1, and may have a different size of the convexity. As an example, the height of the highest convex point of the second part 130_*cel*2 may be lower than the height of the highest convex point of the first part 130_*cel*1. The first light emitting element 151_*t*1 (or the second light emitting element 152_*t*1) may be disposed under the second part 130_*cel*2. The second part 130_*cel*2 may be connected to the first part 130_*cel*1 through the fourth partition wall 130_*cw*4. The second part 130_*cel*2 may be formed of the same material as that of the first part 130_*cel*1.

A fourth partition wall 130_*cw*4 may be disposed in the third part 130_*cel*3 between the first part 130_*cel*1 and the second part 130_*cel*2. The fourth partition wall 130_*cw*4 may be disposed at a boundary between the first part 130_*cel*1 and the second part 130_*cel*2. At least a portion of the fourth partition wall 130_*cw*4 may be located on a line that connects the point protruding to the highest height of the first part 130_*cel*1 and the point protruding to the highest height of the second part 130_*cel*2, and may be disposed in an area that is lower than the highest height of the first part 130_*cel*1 or the highest height of the second part 130_*cel*2. The fourth partition wall 130_*cw*4 may extend from the inlet part to the outlet part of the smart ring device 100. The fourth partition wall 130_*cw*4 may be disposed on a boundary line (or a boundary line between the second light receiving element 150_*r*2 and the second light emitting element 152_*t*1) between the first light receiving element 150_*r*1 and the first light emitting element 151_*t*1. The fourth partition wall 130_*cw*4 may include a material layer that is different from those of the first part 130_*cel*1 and the second part 130_*cel*2. As an example, the fourth partition wall 131_*cw*1 may be formed of a flexible material or an elastic material similar to the material of the first part 130_*cel*1 and the second part 130_*cel*2, and may have different transparency. The description of the third partition wall 130_*cw*3 may be replaced or supplemented with the description of the first partition wall 130_*cw*1 described above with reference to FIG. 6, the description of the second partition wall 130_*cw*2 described with reference to FIG. 9, or the description of the third partition wall 130_*cw*3 described with reference to FIG. 10.

As an example, the size of a cut surface including one point (e.g., a protruding highest height) of the first part 130_*cel*1 displayed in state 1103 may be larger than the size of a cut surface including one point (e.g., a protruding highest height) of the second part 130_*cel*2 displayed in state 1105. A cut surface including one point (e.g., a protruding highest height) of the first part 130_*cel*1 displayed in state 1103 may be larger than the size of a cut surface including a point, at which the fourth partition wall 130_*cw*4 displayed in state 1104 is disposed. A cut surface including a point (e.g., a protruding highest height) of the second part 130_*cel*2 displayed in state 1105 may be larger than the size of a cut surface including a point, at which the fourth partition wall 130_*cw*4 displayed in state 1104 is disposed.

The protruding structure 130_*du* described in FIG. 11 may be applied to at least one of the protruding structures described in FIGS. 1, 2, 6 to 8. It may be applied to at least one of a plurality of protruding structures disposed in the smart ring device 100. As an example, the protruding structure 130_*du* may be applied to at least one of a protruding structure disposed to cover at least a portion of the first light emitting element 151_*t*1 and the first light receiving element 150_*r*1, a protruding structure disposed to cover at least a portion of the second light emitting element 152_*t*1 and the second light receiving element 150_*r*2, or a protruding structure disposed to cover at least a portion of the light emitting element 150_*t*2. There may be various directions, in which the protruding structure 130_*du* is applied to the smart ring device 100. For example, the protruding structure 130_*du* may be applied to the smart ring device 100 in a protruding form (e.g., a form, in which the protruding height is changed from the center Cent_P of the smart ring device 100 in the circumferential direction), such as the first protruding structure 131_*t*2 illustrated in FIG. 8, or may be applied to the smart ring device in a protruding form (e.g., a form, in which the protruding height is changed from the center Cent_P of the smart ring device 100 in a direction from the inlet part to the outlet part), such as the third protruding structure 133_*t*1.

Figure 12:
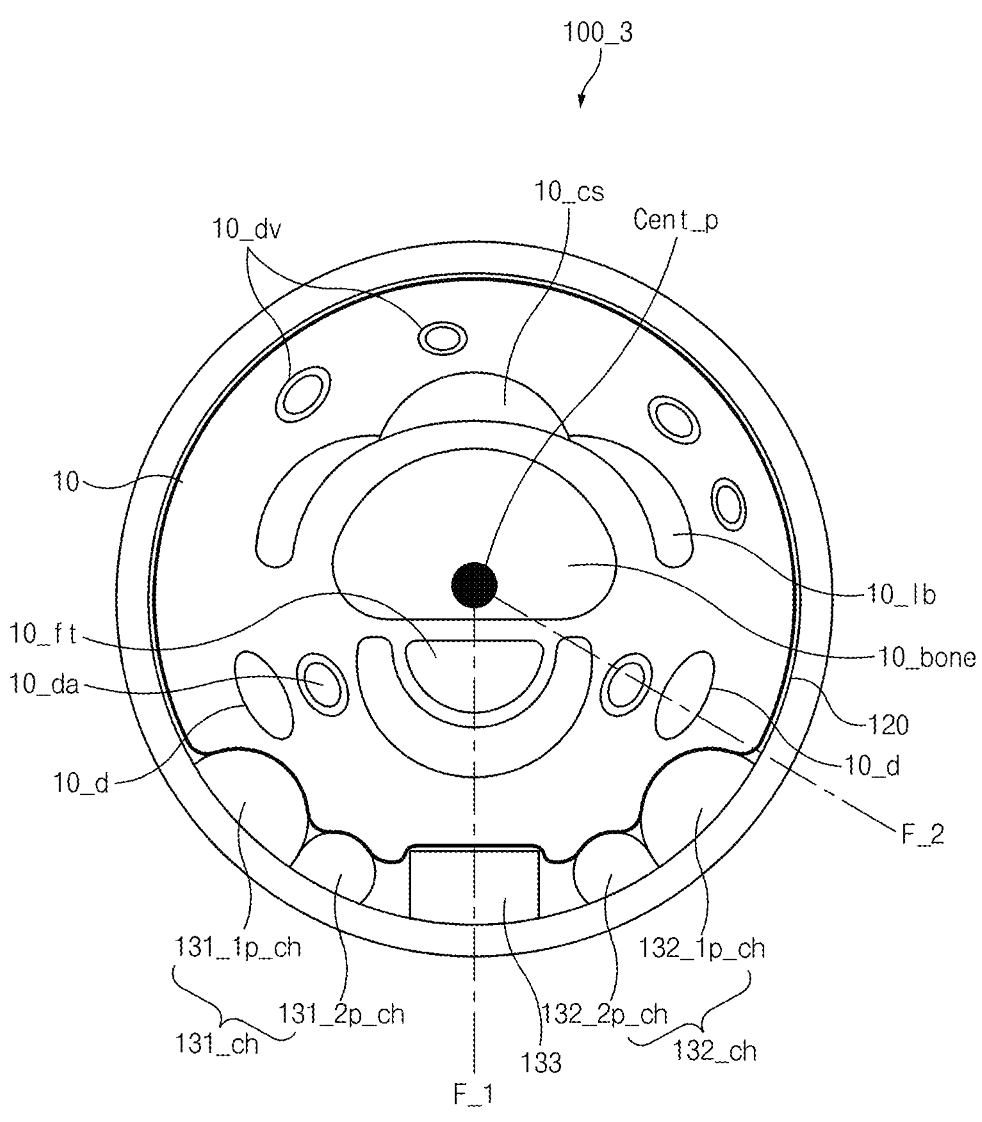
FIG. 12 is a diagram illustrating an example smart ring device according to various embodiments.

FIG. 12 is a diagram illustrating an example of a smart ring device according to various embodiments.

Referring to FIGS. 1, 2, 3, 4, 5, 6, 7, 8, 9, 10, 11 and 12, a user's finger 10 may be inserted into the smart ring device 100_3 according to an embodiment.

The above finger 10 may include a bone 10_*bone*, in which at least a portion thereof is located at the center, arteries 10_*da* located in a specific right or left angle direction (e.g., an angle range of about 50 to 70 degrees to the right or left direction with respect to an imaginary line F_1 that passes through the center of the finger 10), from the center of the finger 10, a nerve 10_*d* that is located on an imaginary line F_2 in the direction, in which the artery 10_*da* is disposed, from the center of the finger 10 and is disposed closer to the skin than the artery 10_*da*, a dorsal vein 10_*dv*, such as a flexor tendon 10_*ft*, an extensor tendon 10_*et* (a central slip 10_*cs* or a lateral band 10_1*b*.

The smart ring device 100_3 may include, for example, an outer structure 110 and an inner structure 120, and may include protruding structures 131_*ch*, 132_*ch*, and 133 that protrude from the inner part of the inner structure 120 toward the center Cent_P of the smart ring device 100_3. According to an embodiment, the smart ring device 100_3 may include an internal element that is disposed between the outer structure 110 and the inner structure 120, and the internal element may include the sensor part (e.g., the sensor part 150 of FIG. 2, hereinafter 150) described above. The sensor part 150 may irradiate specific signals (e.g., sensing signals in the first frequency band and sensing signals in the second frequency band that is different from the first frequency band) toward various tissues located in the finger 10, and may collect signals that are reflected by the skin or internal tissues of the finger 10. According to an embodiment, the sensor part 150 may include a first light receiving element (e.g., the first light receiving element 150_*r*1 of FIG. 2), a first light emitting element (e.g., the first light receiving element 151_*t*1 of FIG. 2), and a second light receiving element (e.g., the second light receiving element 150_*r*2 of FIG. 2), a second light emitting element (e.g., the second light emitting element 152_*t*1 of FIG. 2), and a light emitting element (e.g., the light emitting element 150_*t*2 of FIG. 2). Each of the light receiving and light emitting elements may include various circuitry.

The first light receiving element 150_*r*1 may be disposed between the outer structure 110 and the inner structure 120 to face the artery 10_*da* in one position located in the finger 10. For example, the first light receiving element 150_*r*1 may be located in a range of about 50 to 70 degrees (or 60 degrees) to the left side with respect to the imaginary line F_1 that passes through the center Cent_P of the smart ring device 100_3. The second light receiving element 150_*r*2 may be disposed between the outer structure 110 and the inner structure 120 to face the artery 10_*da* in another position located in the finger 10. For example, the second light receiving element 150_*r*2 may be located in a range (e.g., on the second imaginary line F_2 from the center Cent_P) of about 50 to 70 degrees (or 60 degrees) to the right side with respect to the imaginary line F_1 that passes through the center Cent_P of the smart ring device 1003.

The first light emitting element 151_*t*1 may be disposed adjacent to the first light receiving element 150_*r*1 as is configured to irradiate a signal (e.g., a frequency signal corresponding to a green wavelength) of a short frequency band that is less than a specific reference to the finger 10. In the same way or similarly, the second light emitting element 152_*t*1 may be disposed adjacent to the second light receiving element 150_*r*2 as it is configured to irradiate a signal (or a signal of the same frequency band as that of the first light emitting element 151_*t*1) of a short frequency band that is less than a specific reference to the finger 10. The smart ring device 1003 may include only one light emitting element and one light receiving element.

The light emitting element 150_*t*2 may be disposed between the outer structure 110 and the inner structure 120 that are located on the virtual line F_1. The light emitting element 150_*t*2 may be disposed to irradiate a signal (e.g., a frequency signal corresponding to a red color or a frequency signal corresponding to infra-red) having a wavelength that is longer than the frequency band irradiated from the first light emitting element 151_*t*1 (or the second light emitting element 152_*t*1) toward the finger. The signal irradiated by the light emitting element 150_*t*2 may be irradiated deeper to the finger 10 as compared with the first light emitting element 151_*t*1 (or the second light emitting element 152_*t*1) to be reflected, and may be transmitted to the first light receiving element 150_*t*1 and the second light receiving element 150_*r*2.

The outer structure 110 may have a configuration that is the same as or similar to that of the outer structure of the smart ring device described above with reference to FIGS. 1, 2, 3, 4, 5, 6, 7 and 8 (which may be referred to as FIGS. 1 to 8). For example, as described above with reference to FIGS. 1 to 8, the outer structure 110 may include a first outer part and a first inner part, and may have a circular band shape, and at least a portion of an empty space may be formed in an interior thereof. The description related to the outer structure 110 may be replaced or supplemented with the description of the outer structure described with reference to FIGS. 1 to 8.

The inner structure 120 may be disposed in an interior of the outer structure 110. The inner structure 120 may contact at least a portion of the outer skin of the finger 10 when the finger 10 is inserted. The inner structure 120 may include a second outer part and a second inner part. The description of the inner structure 120 may be replaced or supplemented with the description of the inner structure described with reference to FIGS. 1 to 8. At least one internal element may be disposed between the outer structure 110 and the inner structure 120.

According to an embodiment, on one surface (e.g., a portion of the surface that faces the center Cent_P) of the inner structure 120, a first part 131_1*p*_*ch* of the first protruding structure 131_*ch* that covers the area, in which the first light receiving element (e.g., the first light receiving element 150_*r*1 of FIG. 2) is disposed between the outer structure 110 and the inner structure 120, and a second part 131_2*p*_*ch* that covers the area, in which the first light emitting element (e.g., the first light emitting element 151_*t*1 of FIG. 2) of the first protruding structure 131_*ch* is disposed. At least a portion of the first part 131_1*p*_*ch* and the second part 131_2*p*_*ch* may be connected to each other. According to an embodiment, on another surface (e.g., another portion of the surface that faces the center Cent_P) of the inner structure 120, a third part 132_1*p*_*ch* of the second protruding structure 132_*ch* that covers the area, in which the second light receiving element (e.g., the second light receiving element 150_*r*2 of FIG. 2) is disposed between the outer structure 110 and the inner structure 120, and a fourth part 132_2*p*_*ch* that covers the area, in which the second light emitting element (e.g., the second light emitting element 152_*t*1 of FIG. 2) of the second protruding structure 132_*ch* is disposed. At least a portion of the third part 132_1*p*_*ch* and the fourth part 132_2*p*_*ch* may be connected to each other. With respect to the imaginary line F_1, the first part 131_1*p*_*ch* and the second part 131_2*p*_*ch* may be disposed to be symmetrical to each other with respect to the third part 132_1*p*_*ch* and the fourth part 132_2*p*_*ch*. A third protruding structure 133 disposed to cover the light emitting element (e.g., the light emitting element 150_*t*2 of FIG. 2) may be disposed on another surface (a portion located on the imaginary line F_1 that passes through the center Cent_P) of the inner structure 120.

As described above, the smart ring device 1003 may include a first protruding structure 131_*ch* including a first part 131_1*p*_*ch* and a second part 131_2*p*_*ch* that are connected to each other only at the bottom surface portion (or a surface of the inner part of the inner structure 120). The smart ring device 1003 may include a second protruding structure 132_*ch* including a third part 132_1*p*_*ch* and a fourth part 132_2*p*_*ch* that are connected to each other only at the bottom surface portion (or a surface of the inner part of the inner structure 120). The first protruding structure 131_*ch* and the second protruding structure 132_*ch* of this structure may prevent or reduce the formation of an air gap between the second part 131_2*p*_*ch* (or the fourth part 132_2*p*_*ch*) and the finger by employing a structure for contact between the second part 131_2*p*_*ch* (or the fourth part 132_2*p*_*ch*) that covers the light emitting element that irradiates light, and the finger while preventing or reducing the occurrence of crosstalk by configuring the connection between the first part 131_1*p*_*ch* and the second part 131_2*p*_*ch* (or the third part 132_1*p*_*ch* and the fourth part 132_2*p*_*ch*) at a preset reference connection value or less. Accordingly, the smart ring device 1003 of the disclosure may investigate signals in a first frequency band that is larger than in the situation, in which there is an air gap toward the finger 10, and thus, an environment, in which a better sensor signal (a signal reflected from the finger 10) may be collected, may be provided.

According to an embodiment of the disclosure, the disposition of the light emitting element and the light receiving element may affect the performance of the sensor. For example, a distance, by which a green wavelength (e.g., a signal of the light emitting element) that is mainly used to measure a heart rate penetrates into the skin, is short. Accordingly, as the distance to the light receiving element that irradiates the green wavelength becomes closer, the performance of the sensor of the light emitting element becomes better. A depth, by which the red and IR wavelengths (e.g., the signal of the light emitting element) used to measure the oxygen saturation penetrates into the skin, is longer than the green wavelength, so as the distance to the light receiving element becomes larger compared to the light emitting element, the performance of the sensor becomes better. As the distance between the light emitting element and the light receiving element increases, the amount of light that enters the light receiving element decreases, so that it may be necessary to select the optimal distance and the proper position of the light receiving element. For example, when viewing the cross section of the finger illustrated in FIG. 12, the large artery 10_*da* is located at about 50 to 70 degrees with respect to the palm of the hand. Correspondingly, the smart ring device of the disclosure applies a disposition, in which the light receiving element is disposed near the artery 10_*da* to receive a large amount of light signals reflected by the artery. Correspondingly, the light emitting element (e.g., a green LED) is disposed at a close distance to the light receiving element and is configured to be located in one protruding structure. The light emitting element (e.g., a red/IR LED) may be disposed at the center of the smart ring device 1003. A spacing angle between the light emitting element (the red/IR LED) and the light receiving element is in a range of about 50 to 70 degrees (or about 60 degrees), and the light receiving element may be disposed close to an artery.

At least a portion of the shape of the protruding structure according to an example embodiment of the disclosure may include a dome shape. The protruding structure is disposed in an interior of the smart ring device and has a convex structure. The convex shapes include a sphere and a cylinder, and the sphere is a structure, in which the most convex portion is in the form of dots, and the cylindrical shape is a structure in the form of a line. Furthermore, the cylindrical protruding structure may be flat on opposite sides as described in FIG. 7, but may be changed to a spherical shape as illustrated in FIG. 9, 10, or 11. The smart ring device has a geometrically doughnut-like shape, and may be circular, elliptical, or polygonal. The smart ring device may include a convex structure on the outside and a concave structure on the inside. The protruding structure shape of the disclosure may protrude more convexly than the surroundings, or at least a portion of a portion that contacts the finger may be flat or concave. Because the pain angle decreases when a surface in contact the body is wide, a surface of the protruding structure, which contacts the inside like a cylindrical shape, may become a line, a shape having a flat surface on the top may be included, or a concave surface of the protruding structure on the top may surface-contact the finger portion. When a concave structure is applied, the degree of concaveness of the protruding structure may be determined or adjusted in consideration of the radius of curvature of the smart ring device. The smart ring device may be provided in various sizes (e.g., number), and the size of the ring may be different for each number, and the tilt angle of the sensor part disposed in an interior thereof may be different. As the number of the smart ring device becomes smaller, the radius of curvature may become smaller. Accordingly, as the size of the smart ring device increases, the degree of concaveness of the protruding structure may decrease and the degree of flatness may increase.

Figure 13:
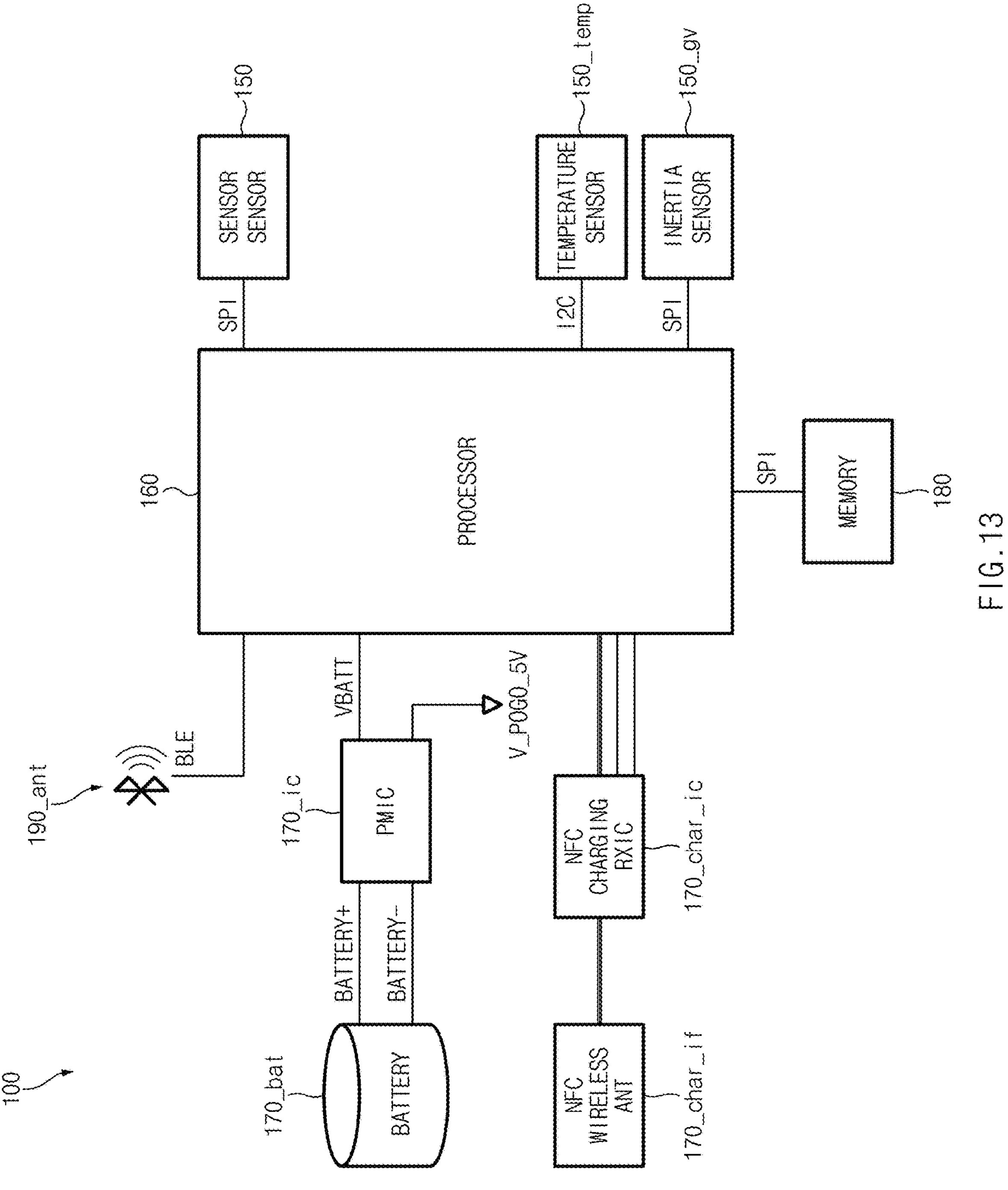
FIG. 13 is a block diagram illustrating an example configuration of a smart ring device according to various embodiments.

FIG. 13 is a block diagram illustrating an example configuration of a smart ring device according to various embodiments.

Each of the functional blocks of the smart ring device 100 described in FIG. 13 may correspond to at least some of the components of the smart ring device described in FIGS. 1 to 12. As an example, the smart ring device 100 may include a processor (e.g., including processing circuitry) 160, a memory 180, a sensor part (e.g., including at least one sensor) 150, a battery 170_*bat*, a power source circuit 170_*ic*, a charging interface (e.g., including circuitry) 170_*char_if*, a charging circuit 170_*char_ic*, an antenna 190_*ant*, a temperature sensor 150_*temp*, and an inertia sensor 150_*gv*. For description, components related to biosignal sensing have been referred to as a sensor part 150, but the disclosure is not limited thereto. For example, the sensor part 150 may also include a temperature sensor 150_*temp* and an inertia sensor 150_*gv*.

Furthermore, the smart ring device 100 may include a housing. The housing has a hole at the center thereof, and may have a shape that may be mounted on a body part, such as a wrist or a finger. The housing shape may have various shapes, such as a circle, a square, and a round square.

The housing above may include a ring having an outer structure (or an outer part or outer ring) and an inner structure (or an inner part or inner ring), and the outer structure may be formed of a material, such as titanium, stainless steel, or ceramics, which may implement various design features while withstanding external impacts and scratches. The outer structure may further include an additional color layer or coating layer. The inner structure is a portion which at least a portion of the finger skin part touches when the smart ring device 100 is mounted on the finger, and at least a portion thereof may be formed of a material, such as an outer structure, or a material, such as a molding material, a transparent plastic, or glass for sensing, may be used. In the inner structure, a metal material for biometric measurement may be partially disposed. At a portion of the inner structure, protruding structures (or protrusions) that protrude in the central direction of the smart ring device 100 on an area, in which the sensor part 150 is disposed, may be further included.

The sensor part 150 may include at least one light emitting element (or emitter including light emitting circuitry). The at least one light emitting element is an element for irradiating light to the skin, and may include an element, such as a lamp, an LED, a laser, and a vertical cavity surface emitting laser (VCSEL). The sensor part 150 may be at least one of the various light emitting elements described above with reference to FIGS. 1 to 12. The sensor part 150 may include at least one sensor, including at least one light receiving element (e.g., a receiver including various circuitry). The at least one light receiving element is an element for measuring light that has passed through and/or reflected through the skin, and may include an individual photodiode (PD), a plurality of PDs, or an image sensor (e.g., a component metal oxide semiconductor (CMOS). The at least one light receiving element may be at least one of the first light receiving element and the second light receiving element described above. The sensor part 150 may include an integrated circuit (IC). As an example, the sensor part 150 may include an analog front end (AFE) that drives a light emitting element, filters and amplifies the signal collected by the light receiving element, and converts the amplified signal into a digital signal.

The processor 160 may include various processing circuitry and calculate a corrected value that reflects the characteristics of the sensor part 150 using the digital data calculated by the AFE in the sensor part 150 together with the corrected value stored in the memory 180. The value may undergo an additional operation of being converted to a standard score between 0 and 100. The processor 160 may control and process the operation of the smart ring device 100, and may perform an operation control, a communication function, and an input/output control of the sensor part 150. The processor 160 may include at least one of an application processor, a supplementary processor (SP), a micro controller unit (MCU), a central processing unit (CPU), a natural processing unit (NPU), a graphic processing unit (GPU), and an Internet of Things (IoT), or a plurality of processors (e.g., AP only, SP only, AP+SP). A plurality of processors, the communication module, and the sensor part 150 may be integrated (e.g., integrated in a system-on-chip form, SoC). The processor 160 may control at least one operation of the smart ring device 100 by executing at least some of the instructions stored in the memory 180. For example, the processor 160 may correspond to a plurality of processors that divide a plurality of operations among processors and collectively perform the operations. Alternatively, the processor 160 illustrated in FIG. 13 may include a plurality of processors, and a specific processor or a designated processor, among a plurality of processors, may control a plurality of operations to be divided and collectively performed by other processors except for the processor itself (or processors including the processor).

According to an embodiment, the processor 160 may control at least some of some components included in the sensor part 150 according to a user input or preset scheduling information. As an example, when a user input related to collecting a first biometric signal and displaying a related function, arrival of a specified period, or a system request occurs, the processor 160 may control a first light emitting element (e.g., the first light emitting element 151_*t*1 of FIG. 2) included in the sensor part 150 and a second light emitting element (the second light emitting element 152_*t*1 of FIG. 2) to irradiate a first signal of a first frequency band to a finger. The processor 160 may perform analysis on a signal (e.g., a signal that is obtained by reflecting a first signal of a first frequency band irradiated to a finger from an interior or skin of the finger and transmitted) collected through the first light receiving element (e.g., the first light receiving element 150_*r*1 of FIG. 2) and the second light receiving element (e.g., the second light receiving element 150_*r*2 of FIG. 2). The processor 160 may output first biometric information (e.g., a heart rate monitoring (HRM) signal) of a user based on the first signal of the first frequency band or information corresponding thereto. As an example, when the smart ring device 100 includes a display (not illustrated), a screen corresponding to the first biometric information may be output through the display of the smart ring device 100. Alternatively, the processor 160 may transmit biometric information to another device (e.g., a smartphone) through the communication module 190 (e.g., the communication module 190 of FIG. 2).

As an example, when a user input related to collecting a second biometric signal and displaying a related function, arrival of a specified period, or a system request occurs, the processor 160 may control a first light emitting element (e.g., the first light emitting element 151_*t*2 of FIG. 2) included in the sensor part 150 and a second light emitting element (the second light emitting element 152_*t*1 of FIG. 2) to irradiate a second signal of a second frequency band to a finger. The processor 160 may perform analysis on a signal (e.g., a signal that is obtained by reflecting a second signal of a second frequency band irradiated to a finger from an interior or skin of the finger and transmitted) collected through the first light receiving element 150_*r*1 and the second light receiving element 150_*r*2. The processor 160 may output second biometric information (e.g., an oxygen saturation degree) of a user based on the second signal of the second frequency band or information corresponding thereto. As an example, when the smart ring device 100 includes a display, a screen corresponding to the second biometric information may be output through the display of the smart ring device 100. The processor 160 may transmit second biometric information to another device (e.g., a smartphone). The processor 160 may perform transmission of a first signal in the first frequency band and transmission of a second signal in the second frequency band in a specific period, and according to the period, signals collected by the first light receiving element 150_*r*1 and the second light receiving element 150_*r*2 may be divided into first biometric information and second biometric information and output, respectively.

The power source circuit 170_*ic* may supply power stored in the battery 170_*bat* to the processor 160, the light emitting element (e.g., LED), and the light receiving element (e.g., PD) of the sensor part 150. The power source circuit 170_*ic* may include a power management IC (PMIC). The power source circuit 170_*ic* may be connected to the charging interface 170_*char_if.*

The charging interface 170_*char_if* may include various circuitry and support wired charging (a terminal, or a pogo pin), wireless power consortium (WPC), and near field communication (NFC) methods for charging devices. The charging interface 170_*char_if* may be connected to the charging circuit 170_*char_ic*.

The memory 180 may store and manage various signals related to driving of the smart ring device 100. The memory 180 may include, for example, a flash memory, a NOR flash, and an electrically erasable programmable read only (EPROM). According to an embodiment, the memory 180 may store a program related to driving the sensor part 150, and may temporarily store a signal collected by the sensor part 150.

The battery 170_*bat* may include a device that converts and stores chemical energy into electricity to supply electric power to the smart ring device 100. The battery 170_*bat* may be configured in the form of a secondary battery, and may be charged and discharged. The battery 170_*bat* may be configured in various ways, such as lithium ions, mercury, and batteries.

The antenna 190_*ant* may include an antenna for wireless communication. The antenna 190_*ant* may include a single or a plurality of segment antennas. The antenna 190_*ant* may be at least a portion of a housing of the smart ring device 100.

The communication module may include various communication circuitry and supports to transmit and receive control commands or data to and from an external device (e.g., a smartphone) wirelessly or by wire. The communication module may include Bluetooth, Bluetooth low energy (BLLE), ZigBee, ANT+, Wi-Fi, Cellular (LTE, 5G, 6G, NB-IoT).

It may include at least one of NFC, RFID, an ultra-wide band (UWB) and a global navigation satellite system (GNSS). The communication module may be used to measure a location using GNSS and wireless communication.

The inertia sensor 150_*gv* may include a sensor that senses inertia, such as an acceleration sensor and a gyroscope. Only an acceleration sensor (3 axes) may be mounted on the inertia sensor 150_*gv*, or may include a 6-axis sensor of acceleration and gyro. The inertia sensor 150_*gv* may sense motion, gesture, impact, posture, and activities (sedentary, movement, or sports) of the smart ring device 100.

The temperature sensor 150_*temp* may include a sensor that measures the temperature of a living body (e.g., a finger) or a component (e.g., the smart ring device 100). The temperature sensor 150_*temp* may include a contact type and a non-contact type depending on a method. The temperature value measured by the temperature sensor 150_*temp* may be stored in the memory 180 or transmitted to the processor 160 to be used to estimate the skin temperature, or may be used to estimate a situation or body temperature.

The above configuration of FIG. 13 may be at least a partial configuration of the smart ring device described in FIGS. 1 to 12. At least a portion of the configuration of FIG. 13 may be excluded.

As described above, the smart ring device including a sensor according to an example embodiment of the disclosure may include: an outer ring, an inner ring disposed inside the outer ring, a printed circuit board disposed between the outer ring and the inner ring, and a first protrusion protruding from one surface of an inner part of the inner structure in a central direction of the smart ring device, the printed circuit board may include a first light receiving element comprising light receiving circuitry disposed in a first position of the outer ring, and a first light emitting element disposed at a second position of the outer ring, and configured to transmit a first signal of a first frequency band, wherein the first protrusion may include a first part protruding from the first light emitting element in a first direction facing the center of the smart ring device, and a second part connected to the first part, and protruding from the first light receiving element in a second direction facing the center of the smart ring device.

According to an example embodiment, the first protrusion may include a semi-cylindrical bottom surface, and the semi-cylindrical flat bottom surface may be disposed on one surface of the inner ring.

According to an example embodiment, at least a portion of an upper end of the first protrusion may be flat.

According to an example embodiment, a maximum protrusion height of the first part and a maximum protrusion height of the second part may be different.

According to an example embodiment, a size of the first part may be greater than a size of the second part.

According to an example embodiment, at least a portion of the first protrusion may be integral with the inner structure.

According to an example embodiment, at least a portion of the first protrusion may include an injection-molded structure.

According to an example embodiment, at least a portion of the first protrusion may comprise a material having a transparency of 90% or more.

According to an example embodiment, at least a portion of the first protrusion may include an elastic material.

According to an example embodiment, the smart ring device may further include a partition wall disposed between the first part and the second part.

According to an example embodiment, at least a portion of the partition wall may comprise an opaque material.

According to an example embodiment, at least a portion of the partition wall may include an elastic material.

According to an example embodiment, the smart ring device may further include a second protrusion protruding from another surface of the inner part of the inner ring in a central direction of the smart ring device.

According to an example embodiment, the printed circuit board may include a second light emitting element disposed at a third position of the outer structure, and configured to transmit the first signal of the first frequency band, and a second light receiving element disposed at a fourth position of the outer ring, and configured to receive a signal irradiated from the second light emitting element, and the second protrusion may include a third part protruding from the second light emitting element in a third direction facing the center of the smart ring device, and a fourth part connected to the third part, and protruding from the second light receiving element in a fourth direction facing the center of the smart ring device.

According to an example embodiment, the first signal of the first frequency band may include a signal of a wavelength band of a green color.

According to an example embodiment, the smart ring device may include a third protrusion protruding from another surface of the inner part of the inner ring in a central direction of the smart ring, and disposed between the first protrusion and the second protrusion.

According to an example embodiment, the printed circuit board may include a third light emitting element disposed at a fifth position of the outer ring, and configured to transmit a second signal of a second frequency band different from the first frequency band, and the third protrusion may protrude from the third light emitting element in a third direction facing a center of the smart ring device.

According to an example embodiment, the second signal of the second frequency band may include a signal of a wavelength band of a red color.

According to an example embodiment, a size of the third protrusion may be smaller than a size of the first protrusion.

According to an example embodiment, the first protrusion and the second protrusion may be disposed to be symmetrical to each other with respect to the third protrusion.

A smart ring device according to an example embodiment of the disclosure may include: an outer ring, and an inner ring, a printed circuit board, at least a portion of which is disposed between the outer ring and the inner ring, and a first protrusion protruding from one surface of an inner part of the inner ring in a central direction of the ring, the first protrusion may include a first part and a second part disposed to cover a first light receiving element comprising light receiving circuitry and a first light emitting element comprising light emitting circuitry disposed in the printed circuit board.

A smart ring device according to an example embodiment of the disclosure may include an outer ring, and an inner ring, a printed circuit board, at least portion of which is disposed between the outer ring and the inner ring—on the printed circuit board, a first light receiving element comprising light receiving circuitry configured to detect a biometric signal in a first frequency band, a first light emitting element comprising light emitting circuitry, located within a first distance from the first light receiving element, and a second light emitting element comprising light emitting circuitry located within the first distance from the first light receiving element, on which the light emitting element located within the second distance greater than the first distance from the first light receiving element, related to sensing of a biometric signal in the second frequency is mounted-, and a first protrusion and a second protrusion protruding further than the surroundings from one surface of an inner part of the inner structure in a central direction of the ring, the first protrusion may include parts covering at least the first light receiving element and the first light emitting element, and the second protrusion may be disposed to cover the second light emitting element at a position spaced apart from the first protrusion.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A smart ring device comprising:

an outer ring;

an inner ring disposed at least partially on an inside of the outer ring and having a center;

a printed circuit board disposed between at least the outer ring and the inner ring; and a first protrusion protruding from one surface of an inner part of the inner ring in a central direction, wherein the printed circuit board includes:

a first light receiving element, comprising light receiving circuitry, disposed at a first position of the outer ring, and a first light emitting element, comprising light emitting circuitry, disposed at a second position of the outer ring and configured to transmit a first signal of a first frequency band, and wherein the first protrusion includes:

a first part protruding from the first light emitting element in a first direction facing the center;

a second part connected to the first part, and protruding from the first light receiving element in a second direction facing the center; and a partition wall disposed between at least the first part and the second part, the partition wall extending from a bottom surface of the first protrusion to a top surface of the first protrusion that is radially inward of the bottom surface.

2. The smart ring device of claim 1, wherein the bottom surface the first protrusion is includes:

a semi-cylindrical bottom surface, and wherein the semi-cylindrical bottom surface is disposed on one surface of the inner ring.

3. The smart ring device of claim 1, wherein at least a portion of an upper end of the first protrusion is flat.

4. The smart ring device of claim 1, wherein a maximum protrusion height of the first part and a maximum protrusion height of the second part are different.

5. The smart ring device of claim 1, wherein a size of the first part is greater than a size of the second part.

6. The smart ring device of claim 1, wherein the first protrusion is integral with the inner ring.

7. The smart ring device of claim 1, wherein at least a portion of the first protrusion is injection molded.

8. The smart ring device of claim 1, wherein at least a portion of the first protrusion comprises a material having a transparency of 90% or more.

9. The smart ring device of claim 1, wherein at least a portion of the first protrusion comprises an elastic material.

10. The smart ring device of claim 1, wherein at least a portion of the partition wall comprises an opaque material.

11. The smart ring device of claim 1, wherein at least a portion of the partition wall comprises an elastic material.

12. The smart ring device of claim 1, wherein the first signal of the first frequency band includes a signal of a wavelength band of a green color.

13. The smart ring device of claim 1, further comprising:

a second protrusion protruding from another surface of the inner part of the inner ring in a central direction of the smart ring device.

14. The smart ring device of claim 13, wherein the printed circuit board includes:

a second light emitting element comprising light emitting circuitry disposed at a third position of the outer ring, and configured to transmit the first signal of the first frequency band; and a second light receiving element comprising light receiving circuitry disposed at a fourth position of the outer ring, and configured to receive a signal irradiated from the second light emitting element, and wherein the second protrusion includes:

a third part protruding from the second light emitting element in a third direction facing the center of the smart ring device; and a fourth part connected to the third part, and protruding from the second light receiving element in a fourth direction facing the center of the smart ring device.

15. The smart ring device of claim 13, further comprising:

a third protrusion protruding from another surface of the inner part of the inner ring in a central direction of the smart ring device, and disposed between the first protrusion and the second protrusion.

16. The smart ring device of claim 15, wherein the printed circuit board includes:

a third light emitting element comprising light emitting circuitry disposed at a fifth position of the outer ring, and configured to transmit a second signal of a second frequency band different from the first frequency band, and wherein the third protrusion protrudes from the third light emitting element in a third direction facing a center of the smart ring device.

17. The smart ring device of claim 16, wherein the second signal of the second frequency band includes a signal of a wavelength and of a red color.

18. The smart ring device of claim 15, wherein a size of the third protrusion is smaller than a size of the first protrusion.

19. The smart ring device of claim 15, wherein the first protrusion and the second protrusion are disposed to be symmetrical to each other with respect to the third protrusion.

* * * * *